(12) United States Patent
Ono

(10) Patent No.: US 10,393,993 B2
(45) Date of Patent: Aug. 27, 2019

(54) LENS DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 66 days.

(21) Appl. No.: 15/871,905

(22) Filed: Jan. 15, 2018

(65) Prior Publication Data

US 2018/0136437 A1 May 17, 2018

Related U.S. Application Data

(63) Continuation of application No. PCT/JP2016/064747, filed on May 18, 2016.

(30) Foreign Application Priority Data

Aug. 19, 2015 (JP) ................................. 2015-161767

(51) Int. Cl.
*G02B 9/00* (2006.01)
*G02B 9/08* (2006.01)
(Continued)

(52) U.S. Cl.
CPC ............... *G02B 7/10* (2013.01); *G02B 5/005* (2013.01); *G02B 7/021* (2013.01); *G02B 7/102* (2013.01);
(Continued)

(58) Field of Classification Search
CPC . G02B 5/005; G03B 3/10; G03B 9/02; G03B 9/06
USPC ........................................ 359/739, 740, 754
See application file for complete search history.

(56) References Cited

U.S. PATENT DOCUMENTS 4,313,663 A 2/1982 Stemme et al.
4,731,626 A 3/1988 Kawamoto
(Continued)

FOREIGN PATENT DOCUMENTS

DE 2816851 10/1979
FR 2352318 12/1977
(Continued)

OTHER PUBLICATIONS

"International Search Report (Form PCT/ISA/210) of PCT/JP2016/064747," dated Aug. 16, 2016, with English translation thereof, pp. 1-5.
(Continued)

*Primary Examiner* — Mahidere S Sahle
(74) *Attorney, Agent, or Firm* — JCIPRNET

(57) ABSTRACT

An object of the present invention is to provide a lens device that is configured such that a first optical-system and a second optical-system are combined to be concentric and that is capable of individually adjusting the light-amount of each optical-system and individually performing focus adjustment on each optical-system. The lens device, which is configured such that the optical-systems are combined to be concentric, comprises a first stop that adjusts a light-amount of the first optical-system and a second stop that adjusts a light-amount of the second optical-system. Thereby, it is possible to adjust individually the light-amounts of the optical-systems. Further, the first optical-system is provided to be movable along the optical axis L together with the first stop, and the second optical-system is provided to be movable along the optical axis L together with the second stop. Thereby, it is possible to individually perform focus adjustment on the optical-systems.

20 Claims, 33 Drawing Sheets

(51) Int. Cl.
*G02B 7/10* (2006.01)
*G03B 9/02* (2006.01)
*H04N 5/238* (2006.01)
*G02B 7/02* (2006.01)
*G03B 9/06* (2006.01)
*G02B 5/00* (2006.01)
*G03B 17/17* (2006.01)
*G03B 19/07* (2006.01)
*G03B 3/10* (2006.01)

(52) U.S. Cl.
CPC ............ *G03B 9/02* (2013.01); *G03B 9/06* (2013.01); *H04N 5/238* (2013.01); *G03B 3/10* (2013.01); *G03B 17/17* (2013.01); *G03B 19/07* (2013.01)

(56) References Cited

U.S. PATENT DOCUMENTS

| | | |
|---|---|---|
| 9,386,215 B2 | 7/2016 | Ono |
| 9,470,875 B2 | 10/2016 | Ono |
| 2006/0266835 A1 | 11/2006 | Tanida |
| 2016/0269667 A1 | 9/2016 | Ono |

FOREIGN PATENT DOCUMENTS

| | | |
|---|---|---|
| JP | 2006333120 | 12/2006 |
| JP | 2007086221 | 4/2007 |
| JP | 2010271429 | 12/2010 |
| JP | 2012155005 | 8/2012 |
| JP | 2015119456 | 6/2015 |
| WO | 2014046184 | 3/2014 |
| WO | 2014129216 | 8/2014 |
| WO | 2015093332 | 6/2015 |
| WO | 2015122117 | 8/2015 |

OTHER PUBLICATIONS

"Written Opinion of the International Searching Authority (Form PCT/ISA/237) of PCT/JP2016/064747," dated Aug. 16, 2016, with English translation thereof, pp. 1-9.

"Search Report of Europe Counterpart Application", dated Jul. 6, 2018, p. 1-p. 6.

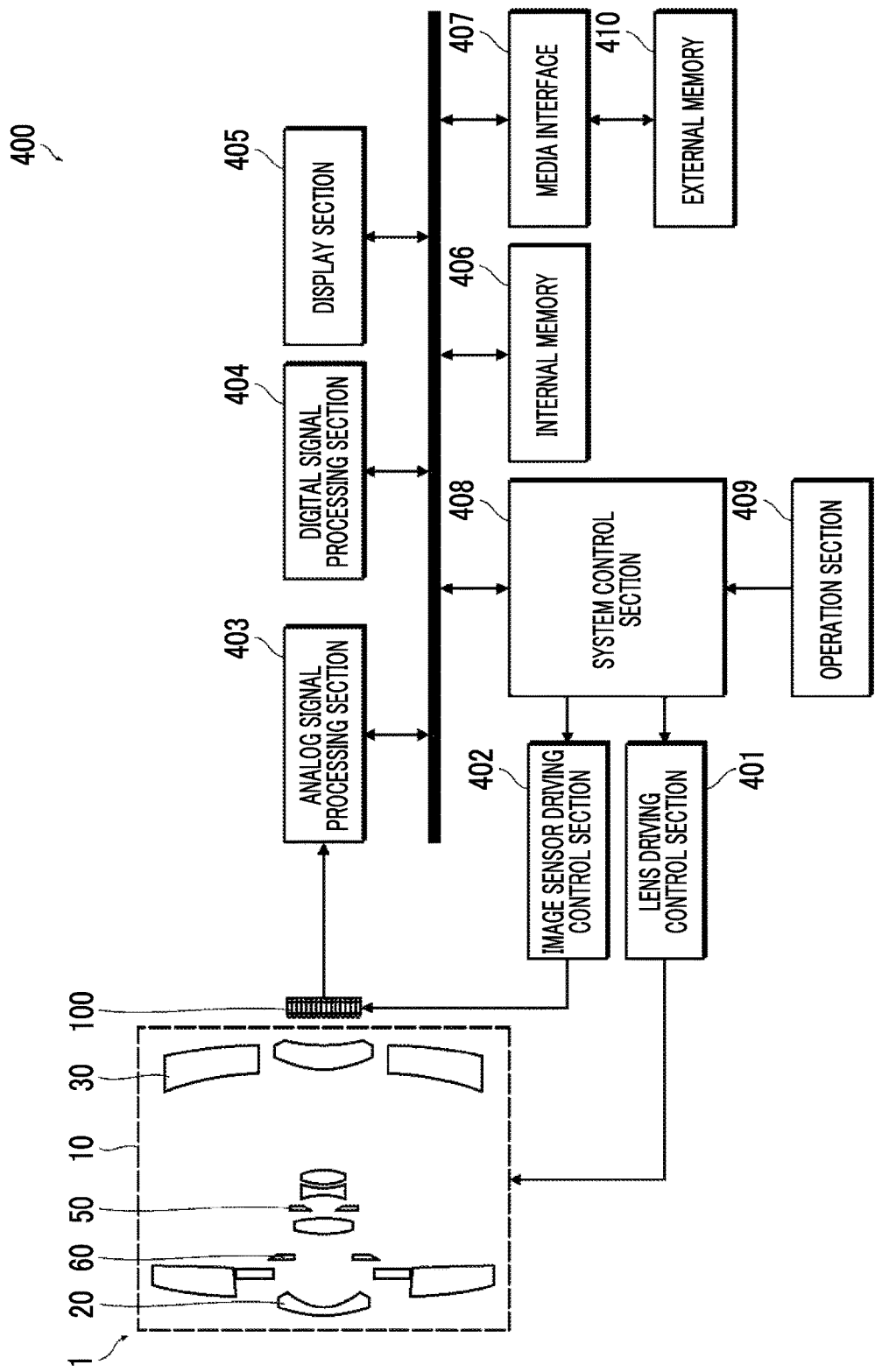

LENS DEVICE

CROSS-REFERENCE TO RELATED APPLICATIONS

This application is a Continuation of PCT International Application No. PCT/JP2016/064747 filed on May 18, 2016, which claims priority under 35 U.S.C § 119(a) to Japanese Patent Application No. 2015-161767 filed on Aug. 19, 2015. Each of the above application(s) is hereby expressly incorporated by reference, in its entirety, into the present application.

BACKGROUND OF THE INVENTION

1. Field of the Invention

The present invention relates to a lens device, and particularly relates to a lens device configured such that a first optical system and a second optical system are combined to be concentric.

2. Description of the Related Art

There are known imaging apparatuses each of which captures two images at the same time by using a lens device, which is configured such that a first optical system and a second optical system are combined to be concentric, and an image sensor which pupil-divides respectively rays incident through the first optical system and the second optical system of the lens device and which selectively receives the rays by pixels (For example, JP2015-119456A). In a case of using the imaging apparatus, for example, by forming the first optical system as a wide-angle optical system and forming the second optical system as a telephoto optical system, it is possible to capture a wide-angle image and a telephoto image at the same time.

SUMMARY OF THE INVENTION

However, in the past, the lens device used in this type of the imaging apparatus has a problem that it is not possible to adjust the light amount since no stop is provided.

Further, focus adjustment is also performed by moving a lens common to each optical system back and forth in the direction of the optical axis or by moving the image sensor back and forth in the direction of the optical axis. Thus, there is a disadvantage in that it is not possible to perform adjustment individually.

The present invention has been made in consideration of the above-mentioned situations, and an object thereof is to provide a lens device capable of individually adjusting the light amount of each optical system and individually performing focus adjustment on each optical system.

Means for solving the problems are as follows.

(1) A lens device comprises: a first optical system; a second optical system that is disposed concentrically with the first optical system and has an annular shape; a first stop that adjusts a light amount of light passing through the first optical system; a second stop that adjusts a light amount of light passing through the second optical system; a first optical system driving section that integrally moves the first optical system and the first stop along an optical axis; and a second optical system driving section that integrally moves the second optical system and the second stop along the optical axis.

According to the present aspect, the lens device, which is configured such that the first optical system and the second optical system are combined to be concentric, comprises a first stop that adjusts a light amount of the first optical system and a second stop that adjusts a light amount of the second optical system. Thereby, it is possible to adjust individually the light amounts of the first optical system and the second optical system. Further, according to the present aspect, the lens device comprises the first optical system driving section that moves the first optical system along the optical axis and the second optical system driving section that moves the second optical system along the optical axis. Thereby, it is possible to perform focus adjustment individually on the first optical system and the second optical system. Furthermore, since the stop is integrally moved in a case where each optical system is moved, the light amount is capable of being adjusted at the optimum position of each optical system.

(2) In the lens device of (1), the first stop has a first light blocking section of which an inner diameter is capable of being increased or decreased and which has an annular shape, and the second stop has a second light blocking section of which an outer diameter is capable of being increased or decreased and which has an annular shape.

According to the present aspect, the first stop has the first light blocking section of which the inner diameter is capable of being increased or decreased and which has an annular shape. With such a configuration, by increasing or decreasing the inner diameter of the first light blocking section, a region, in which light is blocked, expands inward, and thus the light amount of the first optical system is adjusted. Further, the second stop has the second light blocking section of which the outer diameter is capable of being increased or decreased and which has an annular shape. With such a configuration, by increasing or decreasing the outer diameter of the second light blocking section, a region, in which light is blocked, expands outward, and thus the light amount of the second optical system is adjusted.

(3) In the lens device of (2), the second stop has a plurality of second fulcrums that are arranged with regular intervals on a same circumference, a plurality of second stop blades that are swingably supported by the second fulcrums, are arranged to overlap, and compose the second light blocking section, and a second stop blade driving section that swings the second stop blades synchronously. By swinging the second stop blades synchronously through the second stop blade driving section so as to increase or decrease the outer diameter of the second light blocking section, a light amount of the light passing through the second optical system is adjusted.

According to the present aspect, the second light blocking section having an annular shape is configured such that a plurality of second stop blades is disposed to overlap with each other. The second stop increases or decreases the outer diameter of the second light blocking section by swinging the plurality of second stop blades synchronously.

(4) In the lens device of (3), the second stop blade driving section has a second stop blade swing driving member that is disposed coaxially with the second light blocking section, is swingable in a circumferential direction, and has an annular shape, a second cam groove that is disposed the second stop blade swing driving member or on the second stop blades, and a second cam pin that is disposed on the second stop blade swing driving member or on the second stop blades, the other than the second cam groove disposed.

According to the present aspect, the second stop blade driving section is composed of a so-called cam mechanism. Thereby, it is possible to drive the second stop with a simple configuration.

(5) The lens device of (4) may further comprise a second stop blade supporting member that is transparent, and the second stop blade supporting member has the second fulcrum.

According to the present aspect, the second stop blade supporting member, which is transparent, comprises the second fulcrum. Thereby, it is possible to support the second stop without preventing light from passing, in a region through which light passes.

(6) In the lens device of (2), the second stop is composed of liquid crystal elements.

According to the present aspect, the second stop is composed of liquid crystal elements. In this case, for example, the liquid crystal forms an annular light blocking region, the outer diameter of the light blocking region is increased or decreased, and thereby the light amount of light passing through the second optical system is adjusted. In the second optical system, the light blocking region expands from the inside to the outside, and thereby the light amount of light passing therethrough is adjusted to be reduced.

(7) In the lens devices of (2) to (6), the first stop has a plurality of first fulcrums that are arranged with regular intervals on a same circumference, a plurality of first stop blades that are swingably supported by the first fulcrums, are arranged to overlap, and compose the first light blocking section, and a first stop blade driving section that swings the first stop blades synchronously. By swinging the first stop blades synchronously through the first stop blade driving section so as to increase or decrease the inner diameter of the first light blocking section, a light amount of the light passing through the first optical system is adjusted.

According to the present aspect, the first light blocking section having an annular shape is configured such that a plurality of first stop blades is disposed to overlap with each other. The first stop increases or decreases the inner diameter of the first light blocking section by swinging the plurality of first stop blades synchronously.

(8) In the lens device of (7), the first stop blade driving section has a first stop blade swing driving member that is disposed coaxially with the first light blocking section, is swingable in a circumferential direction, and has an annular shape, a first cam groove that is disposed on the first stop blade swing driving member or on the first stop blades, and a first cam pin that is disposed on the first stop blade swing driving member or on the first stop blades, the other than the first cam groove disposed.

According to the present aspect, the first stop blade driving section is composed of a so-called cam mechanism. Thereby, it is possible to drive the first stop with a simple configuration.

(9) The lens device of (8) may further comprise a first stop blade supporting member that is transparent, and the first stop blade supporting member has the first fulcrum.

According to the present aspect, the first stop blade supporting member, which is transparent, comprises the first fulcrum. Thereby, it is possible to support the first stop without preventing light from passing, in a region through which light passes.

(10) In the lens devices of (2) to (6), the first stop is composed of liquid crystal elements.

According to the present aspect, the first stop is composed of liquid crystal elements. In this case, for example, the liquid crystal forms an annular light blocking region, the inner diameter of the light blocking region is increased or decreased, and thereby the light amount of light passing through the first optical system is adjusted. In the first optical system, the light blocking region expands from the outside to the inside, and thereby the light amount of light passing therethrough is adjusted to be reduced.

(11) A lens device comprises: a first optical system; a second optical system that is disposed concentrically with the first optical system and has an annular shape; a first optical system driving section that moves the first optical system along an optical axis; a second optical system driving section that moves the second optical system along the optical axis; and a common stop that blocks light at a boundary between the first optical system and the second optical system, has a common light blocking section of which an inner diameter and an outer diameter are capable of being increased or decreased and which has an annular shape, and adjusts a light amount of light passing through the first optical system and the second optical system by increasing or decreasing the inner diameter and the outer diameter of the common light blocking section.

According to the present aspect, the lens device comprises the first optical system driving section that moves the first optical system along the optical axis and the second optical system driving section that moves the second optical system along the optical axis. Thereby, it is possible to perform focus adjustment individually on the first optical system and the second optical system. Further, according to the present aspect, the lens device, which is configured such that the first optical system and the second optical system are combined to be concentric, comprises a common stop that adjusts the light amounts of the first optical system and the second optical system at the same time. Thereby, it is possible to make the lens device compact.

It should be noted that the boundary between the first optical system and the second optical system means the boundary between the pupil regions of the first optical system and the second optical system.

(12) In the lens device of (11), the common stop has a plurality of fulcrums that are arranged with regular intervals on a same circumference, a plurality of stop blades that are swingably supported by the fulcrums, are arranged to overlap, and compose the common light blocking section, and a stop blade driving section that swings the stop blade synchronously. By swinging the stop blades synchronously through the stop blade driving section so as to decrease an inner diameter in conjunction with an increase of the outer diameter of the common light blocking section and increase the inner diameter in conjunction with a decrease of the outer diameter, light amounts of light passing through the first optical system and the second optical system are adjusted.

According to the present aspect, the common stop has the common light blocking section having an annular shape. With such a configuration, by increasing or decreasing the outer diameter and the inner diameter of the common light blocking section, the light amounts of the first optical system and the second optical system are adjusted. At this time, the inner diameter of the common light blocking section decreases in conjunction with the increase in outer diameter, and the inner diameter increases in conjunction with the decrease in outer diameter. In a case where the outer diameter of the common light blocking section increases, the light blocking region of the second optical system expands from the inside to the outside, and thereby the light amount of light passing through the second optical system is adjusted to be reduced. Further, in a case where the inner diameter of the common light blocking section decreases, the light blocking region of the first optical system expands from the outside to the inside, and thereby the light amount of light passing through the first optical system is adjusted to be reduced. Accordingly, the stops of the first optical system and the second optical system are simultaneously reduced, and simultaneously opened. The common light blocking section is configured such that a plurality of stop blades is disposed to overlap. With such a configuration, by swinging the plurality of stop blades synchronously, the outer diameter and the inner diameter are increased or decreased in conjunction with each other.

(13) In the lens device of (12), the stop blade driving section has a stop blade swing driving member that is disposed coaxially with the common light blocking section, is swingable in a circumferential direction, and has an annular shape, a cam groove that is disposed on the stop blade swing driving member or on the stop blades, and a cam pin that is disposed on the stop blade swing driving member or on the stop blades, the other than the cam groove disposed.

According to the present aspect, the stop blade driving section is composed of a so-called cam mechanism. Thereby, it is possible to drive the common stop with a simple configuration.

(14) The lens device of (13) may further comprise a stop blade supporting member that is transparent, and the stop blade supporting member has the fulcrum.

According to the present aspect, the stop blade supporting member, which is transparent, comprises the fulcrum. Thereby, it is possible to support the common stop without preventing light from passing, in a region through which light passes.

(15) In the lens device of (11), the common stop is composed of liquid crystal elements.

According to the present aspect, the common stop is composed of liquid crystal elements. In this case, for example, the liquid crystal forms an annular light blocking region, the outer diameter and the inner diameter of the light blocking region is increased or decreased, and thereby the light amounts of light passing through the first optical system and the second optical system are adjusted.

(16) In the lens devices of (11) to (15), the first optical system driving section integrally moves the first optical system and the common stop along the optical axis.

According to the present aspect, the common stop integrally moves with the first optical system.

(17) In the lens devices of (11) to (15), the second optical system driving section integrally moves the second optical system and the common stop along the optical axis.

According to the present aspect, the common stop integrally moves with the second optical system.

(18) In the lens devices of (11) to (15), the common stop remains stationary at a certain position.

According to the present aspect, the common stop is provided to remain stationary at a certain position.

(19) The lens devices of (1) to (18) further comprises a common stop moving section that moves the common stop along the optical axis.

According to the present aspect, the common stop is provided to be movable along the optical axis. Thereby, in accordance with positions of the first optical system and the second optical system, the common stop is capable of being provided at an optimum position.

(20) The first optical system and the second optical system have imaging characteristics different from each other.

According to the present aspect, the imaging characteristics of the first optical system and the second optical system are different from each other. Thereby, it is possible to capture images with the different imaging characteristics at the same time.

(21) In the lens device of (20), the first optical system and the second optical system have focal lengths different from each other.

According to the present aspect, optical systems having focal lengths different from each other compose the first optical system and the second optical system. For example, in a case where an optical system having a focal length shorter than that of the second optical system composes the first optical system, it is possible to capture a wide-angle image with a wide angle of view through the first optical system and a telephoto image with a narrow angle of view through the second optical system.

(22) In the lens device of (20), the first optical system and the second optical system have focusing distances different from each other.

According to the present aspect, optical systems having focusing distances different from each other compose the first optical system and the second optical system. For example, in a case where an optical system performing focusing at a range shorter than that of the second optical system composes the first optical system, it is possible to capture a short range image through the first optical system and a long range image through the second optical system.

(23) In the lens device of (20), the first optical system and the second optical system have transmission wavelength characteristics different from each other.

According to the present aspect, optical systems having transmission wavelength characteristics different from each other compose the first optical system and the second optical system. For example, the first optical system is composed of an optical system having transmission wavelength characteristics suitable for imaging through visible light, and the second optical system is composed of an optical system having transmission wavelength characteristics suitable for imaging through infrared light. Thereby, it is possible to capture a visible light image through the first optical system and an infrared image through the second optical system.

According to the present invention, it is possible to individually adjust the light amount of each optical system, and it is possible to individually perform focus adjustment on each optical system.

BRIEF DESCRIPTION OF THE DRAWINGS

FIG. 33 is a block diagram illustrating a system configuration of an imaging apparatus.

DESCRIPTION OF THE PREFERRED EMBODIMENTS

Hereinafter, preferred embodiments of the present invention will be described in detail with reference to the accompanying drawings.

First Embodiment

<<Imaging Unit>>

Figure 1:
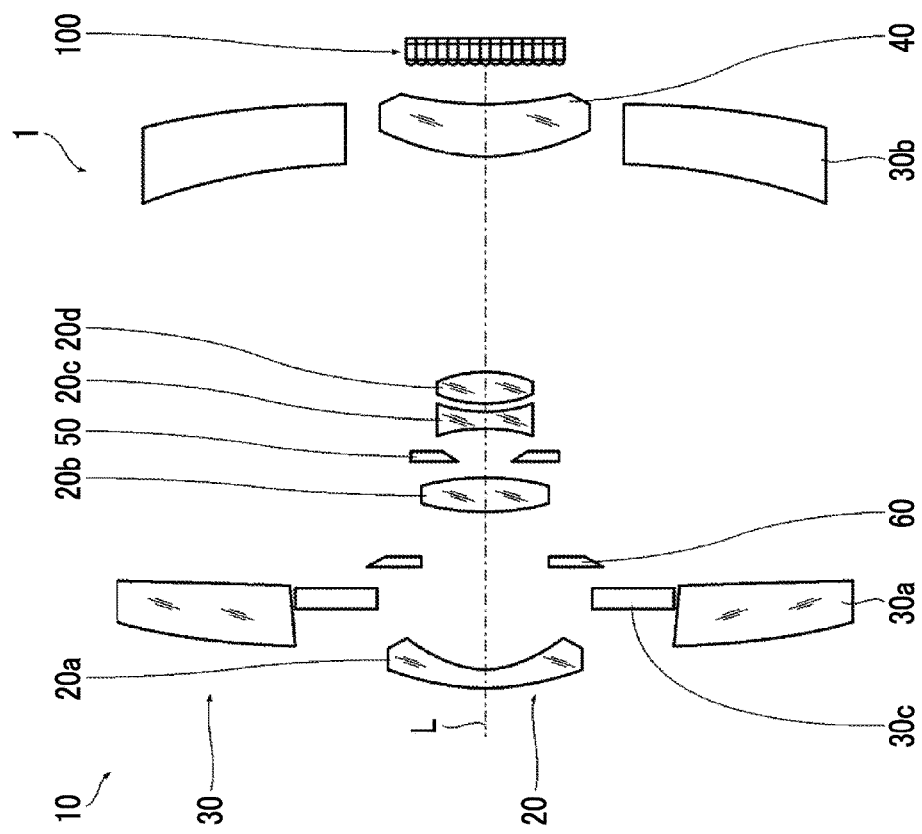
FIG. 1 is a schematic configuration diagram of an imaging unit composed of a lens device and an image sensor.

FIG. 1 is a schematic configuration diagram of an imaging unit composed of a lens device and an image sensor.

The imaging unit 1 is composed of a lens device 10 and an image sensor 100, receives light, which passes through the lens device 10, through the image sensor 100, converts the light into an electrical signal, and outputs the signal.

The lens device 10 is configured such that a first optical system 20 and a second optical system 30 are combined to be concentric. The first optical system 20 and the second optical system 30 are composed of optical systems having imaging characteristics different from each other. In the lens device 10 of the present embodiment, the first optical system 20 and the second optical system 30 are composed of optical systems having focal lengths different from each other. In particular, in the lens device 10 of the present embodiment, the first optical system 20 is composed of an optical system having a focal length shorter than that of the second optical system 30. Therefore, in the lens device 10 of the present embodiment, a wide-angle image having a wide angle of view is captured through the first optical system 20 and a telephoto image having a narrow angle of view is captured through the second optical system 30. The lens device 10 will be described later in detail.

The image sensor 100 is composed of a so-called directional sensor, pupil-divides the rays incident through the first optical system 20 and the second optical system 30, selectively receives light through pixels which are two-dimensionally arranged, and converts the light into an electric signal. Therefore, it is possible to acquire an image signal of an image obtained through the first optical system 20 by acquiring the electric signal of the pixels receiving the light passing through the first optical system 20, and it is possible to acquire an image signal of an image obtained through the second optical system 30 by acquiring the electric signal of the pixels receiving the light passing through the second optical system 30. The image sensor 100 will be described later in detail.

<<Details of Lens Device>>

As described above, the lens device 10 is configured such that the first optical system 20 and the second optical system 30 having different focal lengths from each other are combined to be concentric.

The lens device 10 is configured to mainly comprise: a first optical system 20; a second optical system 30 that is disposed concentrically with the first optical system 20 and has an annular shape; a common lens 40 that is common to the first optical system 20 and the second optical system 30; a first stop 50 that adjusts a light amount of light passing through the first optical system 20; a second stop 60 that adjusts a light amount of light passing through the second optical system 30; a first optical system driving section 70 that integrally moves the first optical system 20 and the first stop 50 along an optical axis L; and a second optical system driving section 80 that integrally moves the second optical system 30 and the second stop 60 along the optical axis L. Each component is disposed in a lens barrel which is not shown.

<First Optical System>

The first optical system 20 is composed by combining a plurality of lenses. The wide-angle lens group composing the first optical system 20 is composed of a first wide-angle lens 20a, a second wide-angle lens 20b, a third wide-angle lens 20c, and a fourth wide-angle lens 20d. The first wide-angle lens 20a, the second wide-angle lens 20b, the third wide-angle lens 20c, and the fourth wide-angle lens 20d are arranged in order of the first wide-angle lens 20a, the second wide-angle lens 20b, the third wide-angle lens 20c, and the fourth wide-angle lens 20d from the subject side, and are arranged along the optical axis L, respectively.

Figure 2:
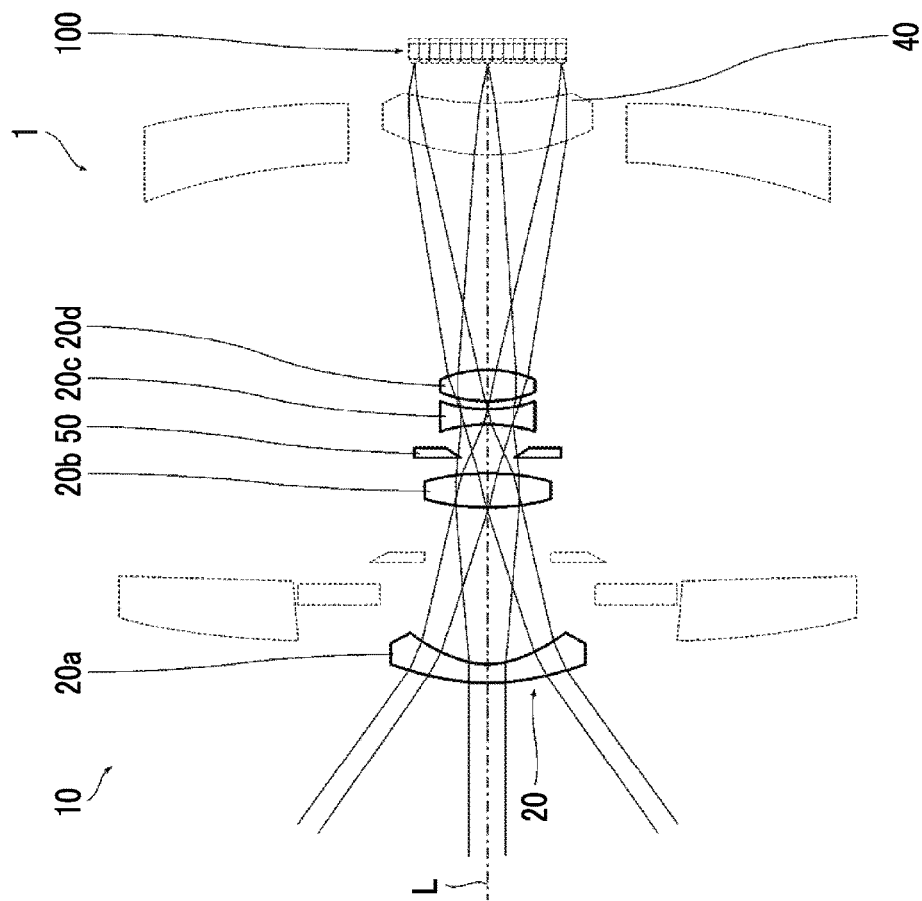
FIG. 2 is a view illustrating ray trajectories of light passing through a first optical system.

FIG. 2 is a view illustrating ray trajectories of light passing through a first optical system. As shown in the drawing, the light incident on the first optical system 20 passes through the first wide-angle lens 20a, the second wide-angle lens 20b, the third wide-angle lens 20c, and the fourth wide-angle lens 20d in this order, and is incident on the common lens 40.

The first optical system 20 is provided to be movable back and forth along the optical axis L. The first wide-angle lens 20a, the second wide-angle lens 20b, the third wide-angle lens 20c, and the fourth wide-angle lens 20d composing the first optical system 20 moves along the optical axis L while keeping the positional relationships thereof constant.

<Second Optical System>

The second optical system 30 is disposed concentrically with the first optical system 20. Consequently, the optical axis thereof is commonly used in the first optical system 20.

The second optical system 30 is composed of a so-called reflection telephoto type optical system, and is composed by combining an annular lens and an annular mirror. The telephoto lens group composing the second optical system 30 is composed of a first telephoto lens 30a, a first telephoto mirror 30b, and a second telephoto mirror 30c. The first telephoto lens 30a, the first telephoto mirror 30b, and the second telephoto mirror 30c are arranged along the optical path from the subject side to the common lens 40 in order of the first telephoto lens 30a, the first telephoto mirror 30b, and the second telephoto mirror 30c, and are arranged along the optical axis L, respectively.

Figure 3:
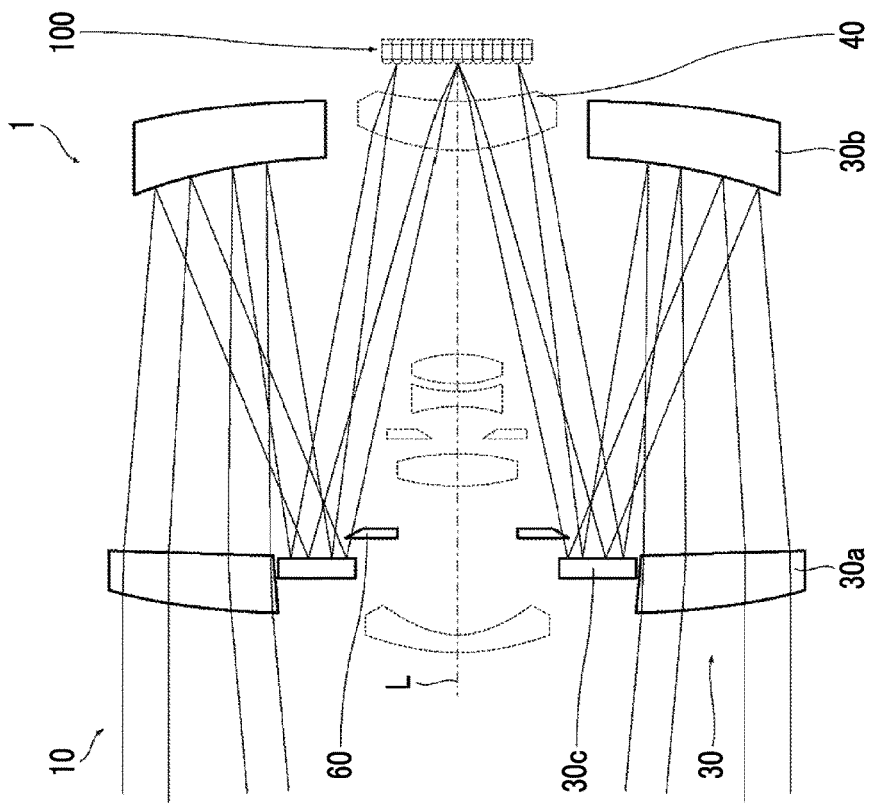
FIG. 3 is a view illustrating ray trajectories of light passing through a second optical system.

FIG. 3 is a view illustrating ray trajectories of light passing through the second optical system. As shown in the drawing, the light incident on the second optical system 30 is transmitted through the first telephoto lens 30a, is reflected by the first telephoto mirror 30b, is further reflected by the second telephoto mirror 30c, and is incident on the common lens 40.

The second optical system 30 is provided to be movable back and forth along the optical axis L. The first telephoto lens 30a, the first telephoto mirror 30b, and the second telephoto mirror 30c composing the second optical system 30 move along the optical axis L while keeping the positional relationships thereof constant.

<Common Lens>

The common lens 40 is a lens commonly used in the first optical system 20 and the second optical system 30, and is disposed to remain stationary at a certain position on the optical axis L. The common lens 40 adjusts the incident angle of light incident on the image sensor 100. The light, which passes through the first optical system 20 and the second optical system 30, is incident on the image sensor 100 through the common lens 40.

<First Stop>

The first stop 50 adjusts the light amount of light passing through the first optical system 20. The first stop 50 is disposed on the optical axis L and is disposed between the second wide-angle lens 20b and the third wide-angle lens 20c composing the first optical system 20.

Figure 4:
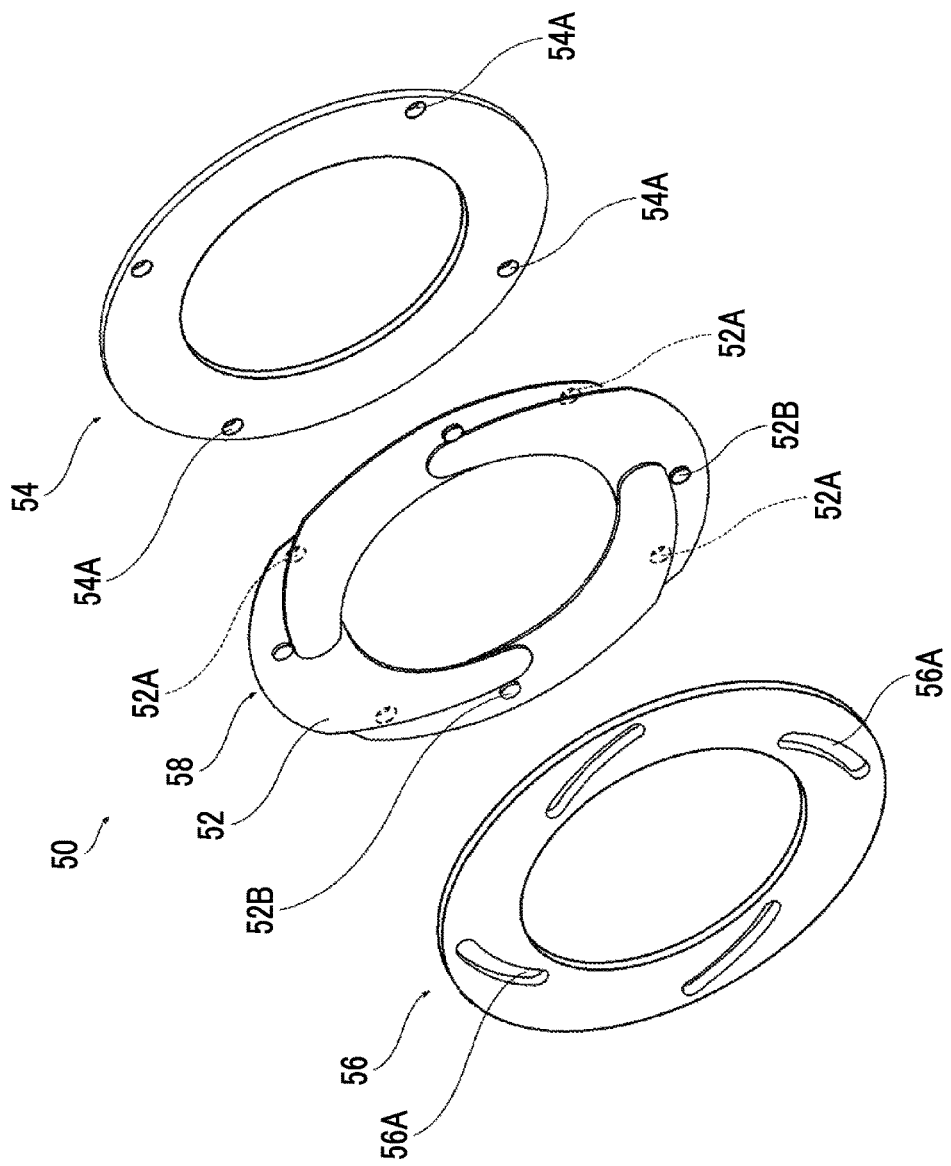
FIG. 4 is an exploded perspective view of the first stop.
Figure 5:
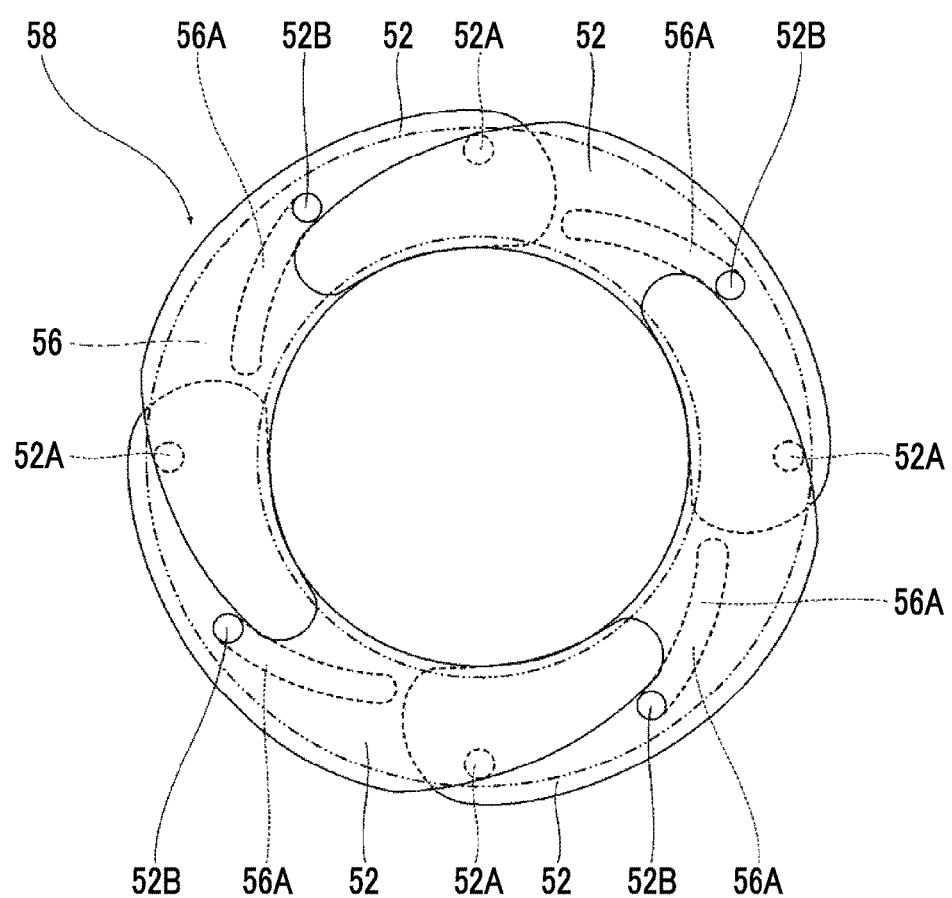
FIG. 5 is a front view illustrating a configuration of arrangement of first stop blades.

FIG. 4 is an exploded perspective view of the first stop. FIG. 5 is a front view illustrating a configuration of arrangement of the first stop blades.

The first stop 50 is configured to mainly comprises a plurality of first stop blades 52, a first stop blade supporting member 54 that swingably supports the plurality of first stop blades 52, a first stop blade swing driving member 56 that swings the plurality of first stop blades 52 synchronously, and a first actuator (not shown in the drawing) that operates the first stop blade swing driving member 56.

The plurality of first stop blades 52 all has the same shape. The respective first stop blades 52 are arranged with regular intervals on the same circumference, and are arranged such that the first stop blades 52 adjacent to each other overlap each other. As shown in FIG. 5, the first stop blades 52 arranged in such a manner form a first light blocking section 58, which has an annular shape, as a whole. FIG. 5 shows a state in which the first stop 50 is released, that is, a state in which the first stop 50 is fully opened. In this case, the inner diameter of the first light blocking section 58, which has an annular shape, is the maximum.

As shown in FIG. 4, the first stop blade supporting member 54 is composed of an annular plate material. The first stop blade supporting member 54 is disposed coaxially with the first light blocking section 58 which has an annular shape. The first stop blade supporting member 54 comprises a plurality of bearing holes 54A. The bearing holes 54A are arranged with regular intervals on the same circumference. Each bearing hole 54A composes a first fulcrum.

Each of the first stop blades 52 is provided with a first swing shaft 52A that is able to be fitted into the bearing hole 54A. Each of the first stop blades 52 is swingably supported on the first stop blade supporting member 54 by fitting the first swing shaft 52A in the bearing hole 54A.

As shown in FIG. 4, the first stop blade swing driving member 56 is composed of an annular plate material. The first stop blade swing driving member 56 is disposed coaxially with the first light blocking section 58 and supported by a supporting member, which is not shown, so as to be swingable in the circumferential direction. The first stop blades 52 are arranged to be sandwiched between the first stop blade swing driving member 56 and the first stop blade supporting member 54.

The first stop blade swing driving member 56 comprises a plurality of first cam grooves 56A. The plurality of first cam grooves 56A all has the same shape, and is disposed at regular intervals on the same circumference.

Each of the first stop blades 52 comprises a first cam pin 52B. The first cam pin 52B is fitted into each of the first cam grooves 56A. In a case where the first cam pin 52B is fitted into the first cam groove 56A, the first stop blade swing driving member 56 is swung, and then the first stop blades 52 swing in conjunction with the motion of the first stop blade swing driving member 56.

The first cam pins 52B, the first cam grooves 56A, and the first stop blade swing driving member 56 compose a first stop blade driving section for synchronously swinging the first stop blades 52.

The first actuator, which is not shown, is composed of, for example, a motor, and swings the first stop blade swing driving member 56 in the circumferential direction.

The first stop 50 is configured as described above.

Figure 6:
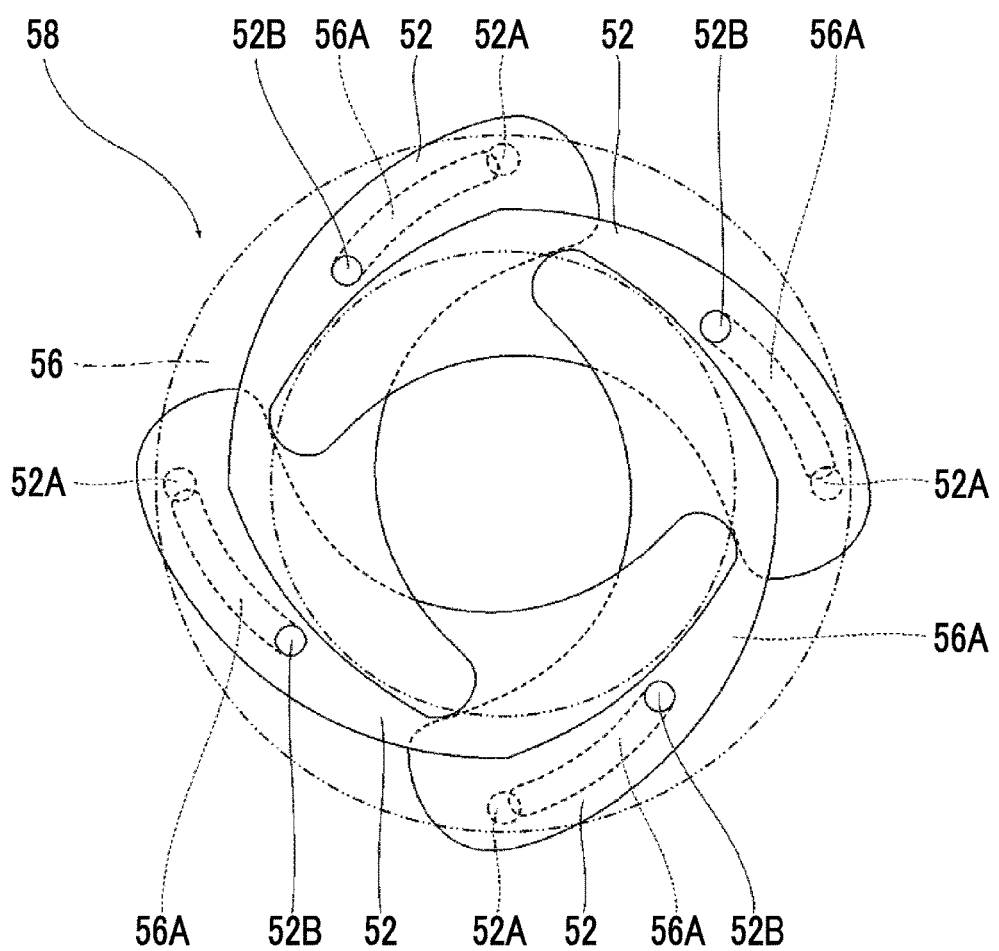
FIG. 6 is an explanatory diagram of the operation of a first stop.

FIG. 6 is an explanatory diagram of the operation of the first stop.

In a case where the first stop blade swing driving member 56 is swung, all the first stop blades 52 swing synchronously around the bearing hole 54A as the first fulcrum by the action of the first cam grooves 56A and the first cam pins 52B. As a result, the inner diameter of the first light blocking section 58 composed of the first stop blades 52 is increased or decreased.

As described above, the first stop 50 is disposed between the second wide-angle lens 20b and the third wide-angle lens 20c. The light incident on the first optical system 20 passes through the inside of the first stop 50 and is incident on the image sensor 100 (refer to FIG. 2). More specifically, the light passes through the inside of the first light blocking section 58 composed of the first stop blades 52 and is incident on the image sensor 100. In the first stop 50, in a case where the first stop blade 52 is swung, the inner diameter of the first light blocking section 58 is increased or decreased. Therefore, by increasing and decreasing the inner diameter of the first light blocking section 58, it is possible to adjust the light amount of the light passing through the first optical system 20.

Since the optical path of the light passing through the second optical system 30 is on the outside of the first stop 50, the first stop 50 is provided in consideration of the optical path of the second optical system 30. Preferably, in a state where the stop is released, the first light blocking section 58 is provided so as to block the light at the boundary between the pupil regions of the first optical system 20 and the second optical system 30. As a result, it is possible to improve separability of light incident on the image sensor 100 through the first optical system 20 and light incident on the image sensor 100 through the second optical system 30, and thus it is possible to effectively suppress interference therebetween.

<Second Stop>

The second stop 60 adjusts the light amount of light passing through the second optical system 30. The second stop 60 is disposed on the optical axis L and is disposed immediately behind the second telephoto mirror 30c composing the second optical system 30.

Figure 7:
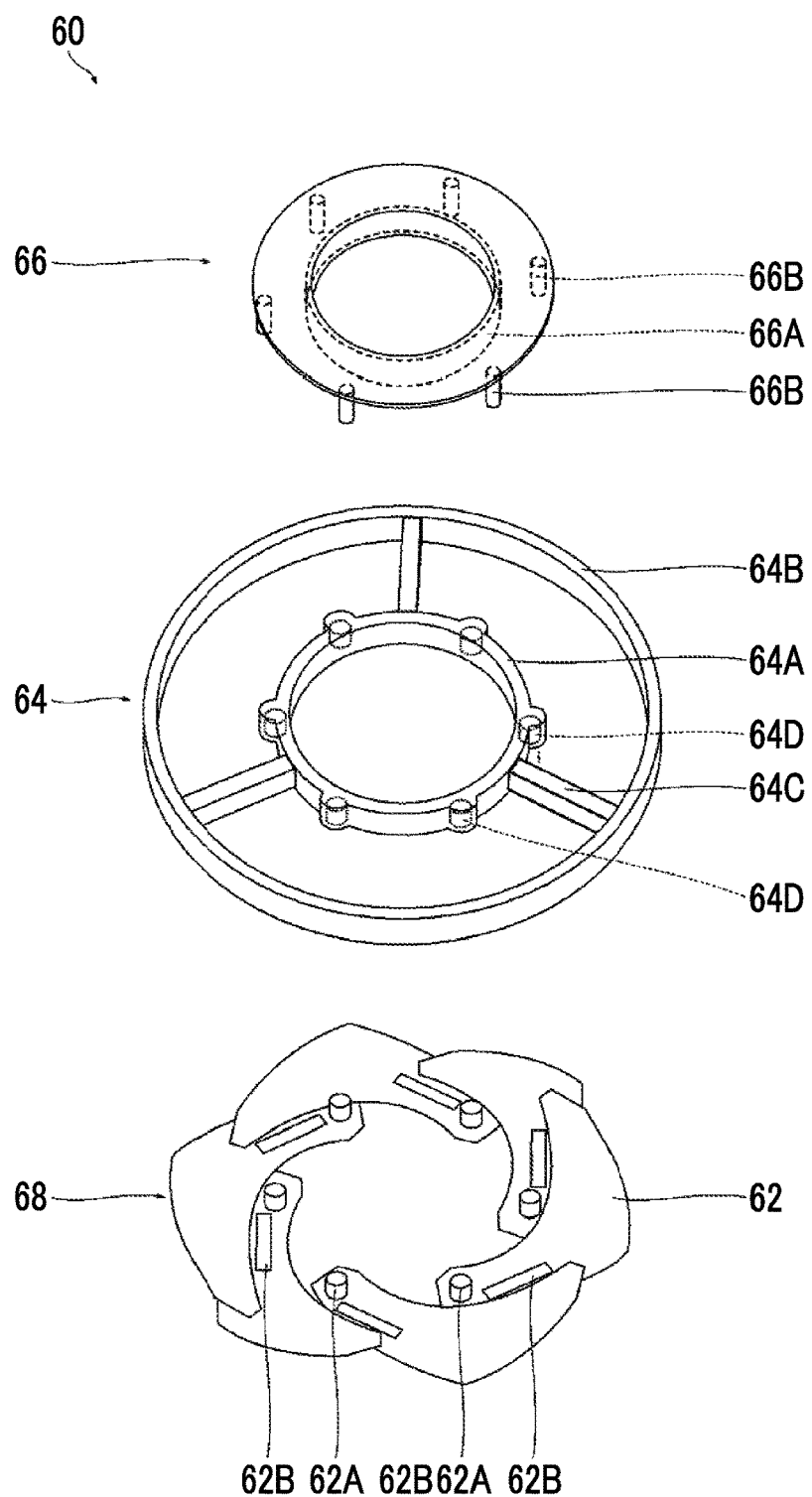
FIG. 7 is an exploded perspective view of a second stop.

FIG. 7 is an exploded perspective view of the second stop. Further, FIG. 8 is a front view of the second stop blade composing the second stop, and FIG. 9 is a front view illustrating a configuration of arrangement of the second stop blades.

As shown in FIG. 7, the second stop 60 is configured to mainly comprise a plurality of second stop blades 62, a second stop blade supporting member 64 that swingably supports the plurality of second stop blades 62, a second stop blade swing driving member 66 that swings the plurality of second stop blades 62 synchronously, and a second actuator (not shown in the drawing) that operates the second stop blade swing driving member 66.

Figure 8:
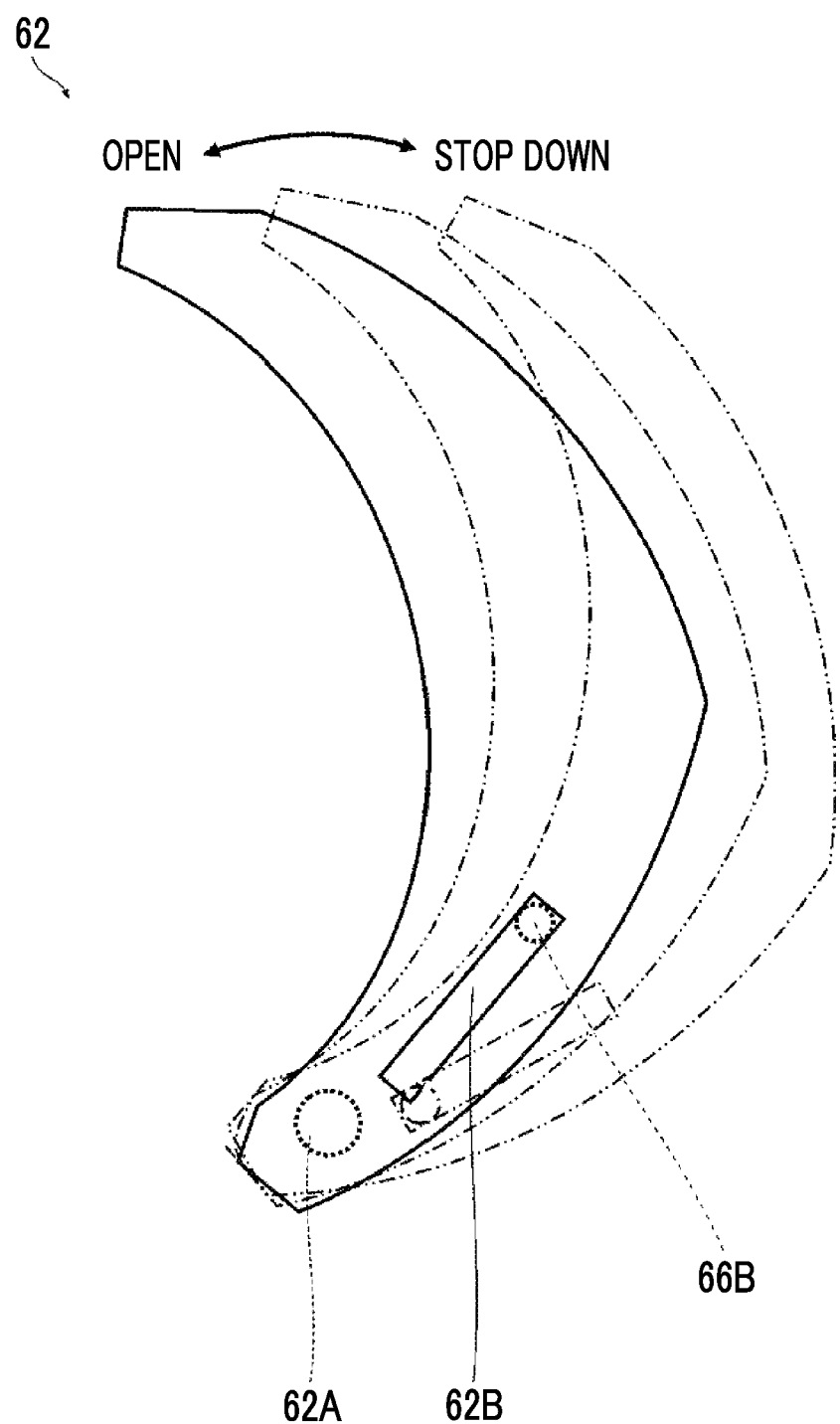
FIG. 8 is a front view of a second stop blade composing the second stop.
Figure 9:
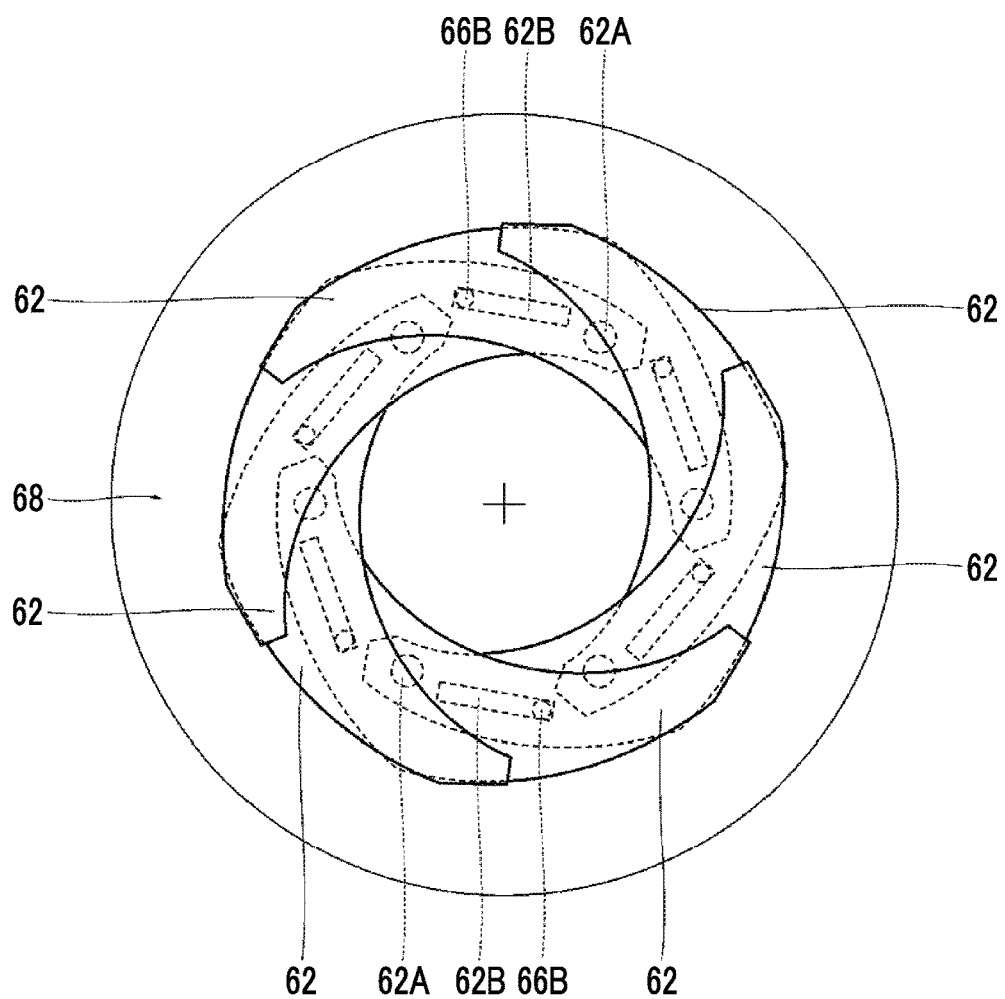
FIG. 9 is a front view illustrating a configuration of arrangement of second stop blades.

The second stop blades 62 all have the same shape, and have an arcuate shape as shown in FIG. 8. As shown in FIG. 9, the second stop blades 62 are respectively arranged with regular intervals on the same circumference, and the second stop blades 62 adjacent to each other are arranged to overlap with each other. The second stop blades 62 arranged in such a manner form the second light blocking section 68 having an annular shape as a whole. FIG. 9 shows a state in which the second stop 60 is released, that is, a state in which the second stop 60 is fully opened. In this case, the outer diameter of the second light blocking section 68 is minimized.

The second stop blade supporting member 64 is disposed coaxially with the second light blocking section 68. As shown in FIG. 7, the second stop blade supporting member 64 is configured to comprise an inner frame 64A, an outer frame 64B, three support arms 64C, and bearings 64D. Both the inner frame 64A and the outer frame 64B are composed of annular frames, and are arranged concentrically. The three support arms 64C are arranged radially, and connect the inner frame 64A and the outer frame 64B to each other. The bearings 64D are provided in the inner frame 64A, and are arranged with regular intervals in the circumferential direction. Each bearing 64D composes a second fulcrum.

Each second swing shaft 62A, which is capable of being fitted into the bearing 64D, is provided at the base end section of each second stop blade 62. Each second stop blade 62 is swingably supported by the second stop blade supporting member 64 by fitting the second swing shaft 62A into the bearing 64D.

The second stop blade swing driving member 66 is disposed coaxially with the second light blocking section 68. As shown in FIG. 7, the second stop blade swing driving member 66 is composed of an annular plate material, and comprises a fitting portion 66A having an annular shape at the inner peripheral portion thereof. By fitting the fitting portion 66A into the inner peripheral portion of the second stop blade supporting member 64, the second stop blade swing driving member 66 is disposed coaxially with the second stop blade supporting member 64 and the second light blocking section 68, and is supported swingably in the circumferential direction.

The second stop blade swing driving member 66 comprises a plurality of second cam pins 66B. The second cam pins 66B are arranged with regular intervals on the same circumference.

Each of the second stop blades 62 comprises a second cam groove 62B. The second cam pin 66B is fitted into each of the second cam grooves 62B. In a case where the second cam pin 66B is fitted into each of the second cam grooves 62B, the second stop blade swing driving member 66 is swung, and then the second stop blades 62 swing in conjunction with the motion of the second stop blade swing driving member 66.

The second cam grooves 62B, the second cam pins 66B, and the second stop blade swing driving member 66 compose a second stop blade driving section for synchronously swinging the second stop blades 62.

The second actuator, which is not shown, is composed of, for example, a motor, and swings the second stop blade swing driving member 66 in the circumferential direction.

Figure 10:
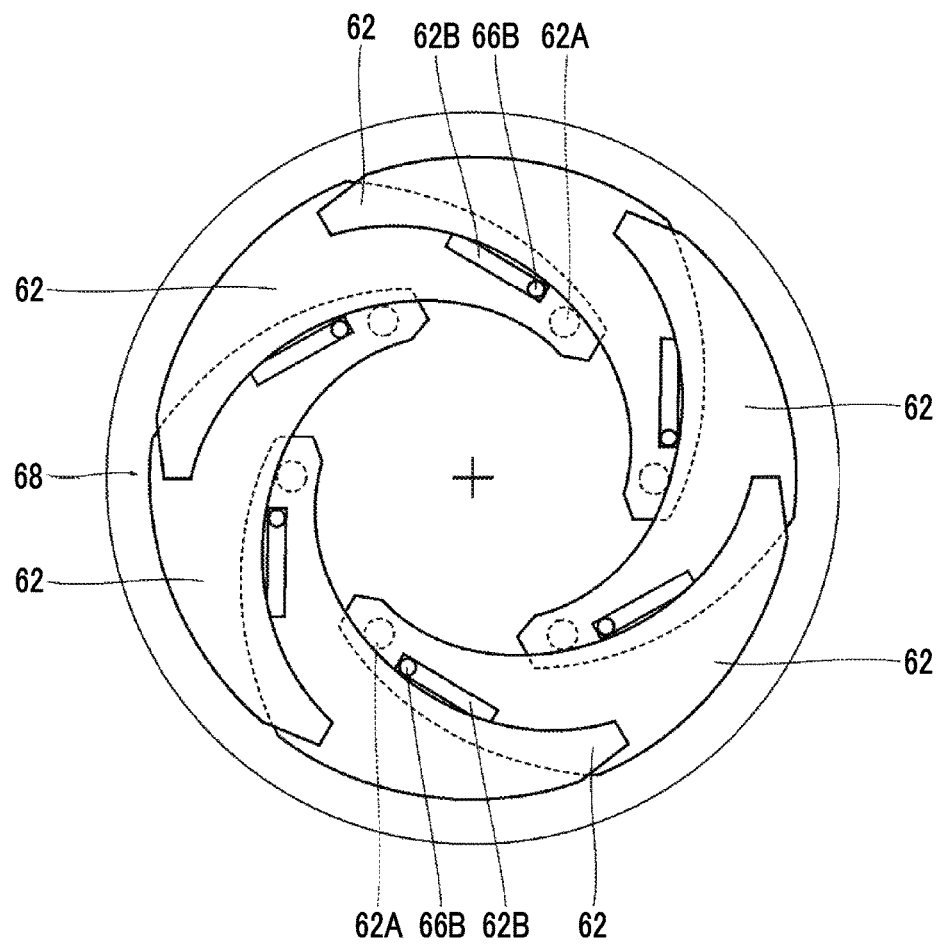
FIG. 10 is an explanatory diagram of the operation of the second stop.

FIG. 10 is an explanatory diagram of the operation of the second stop.

In a case where the second stop blade swing driving member 66 is swung, all the second stop blades 62 swing synchronously around the bearing 64D as the second fulcrum by the action of the second cam pins 66B and the second cam grooves 62B. As a result, the outer diameter of the second light blocking section 68 composed of the second stop blades 62 is increased or decreased.

As described above, the second stop 60 is disposed immediately behind the second telephoto mirror 30c. The light incident on the second optical system 30 passes through the outside of the second stop 60 and is incident on the image sensor 100 (refer to FIG. 3). More specifically, the light passes through the outside of the second light blocking section 68 composed of the second stop blade 62 and is incident on the image sensor 100. In the second stop 60, in a case where the second stop blade 62 is swung, the outer diameter of the second light blocking section 68 is increased or decreased. Therefore, by increasing and decreasing the outer diameter of the second light blocking section 68, it is possible to adjust the light amount of the light passing through the second optical system 30.

Since the optical path of the light passing through the first optical system 20 is on the outside of the second stop 60, the second stop 60 is provided in consideration of the optical path of the second optical system 30. Preferably, in a state where the stop is released, the second light blocking section 68 is provided so as to block the light at the boundary between the pupil regions of the first optical system 20 and the second optical system 30. As a result, it is possible to improve separability of light incident on the image sensor 100 through the first optical system 20 and light incident on the image sensor 100 through the second optical system 30, and thus it is possible to effectively suppress interference therebetween.

<First Optical System Driving Section>

The first optical system driving section 70 integrally moves the first optical system 20 and the first stop 50 along the optical axis L.

Figure 11:
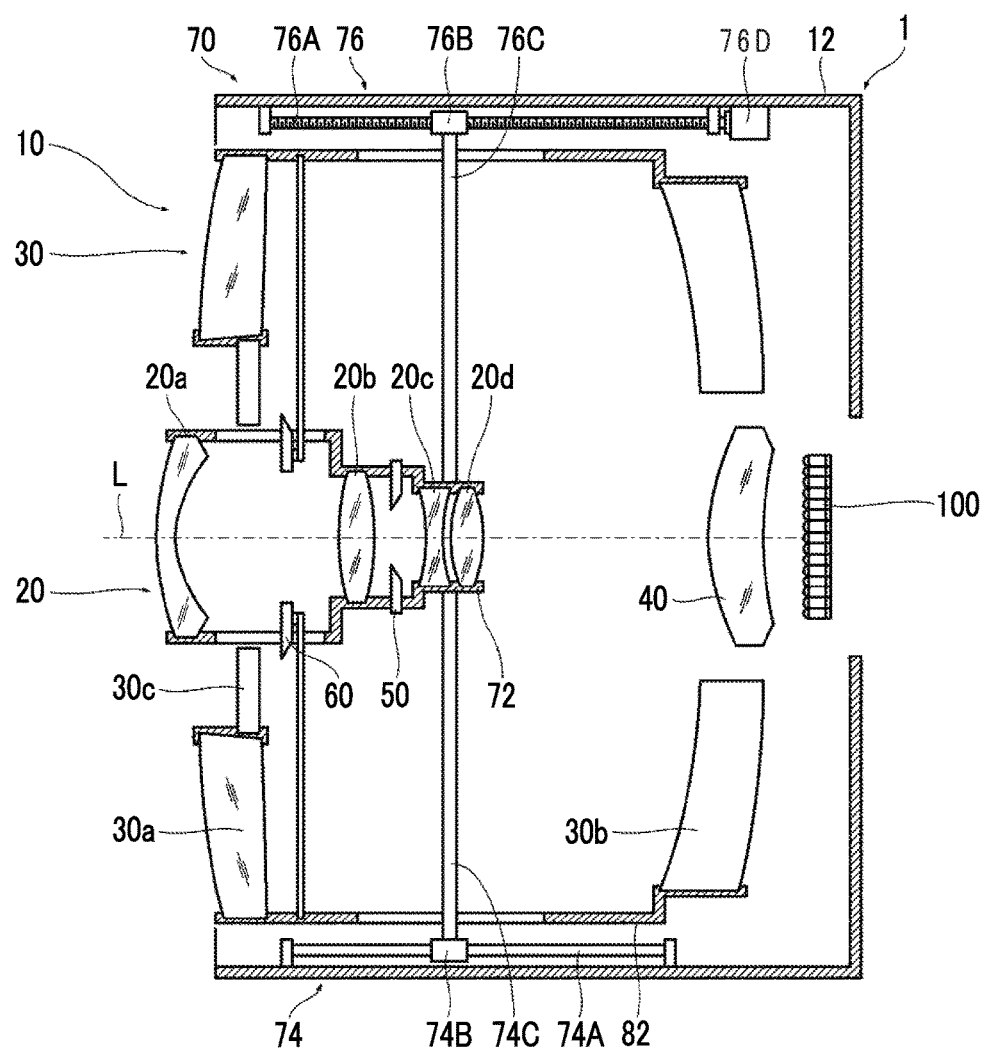
FIG. 11 is a cross-sectional view illustrating a schematic configuration of a first optical system driving section.

FIG. 11 is a cross-sectional view illustrating a schematic configuration of the first optical system driving section.

The first optical system driving section 70 is configured to comprise a first optical system holding member 72 that holds the first stop 50 and the lens groups composing the first optical system 20, a first guide mechanism 74 that guides the first optical system holding member 72 along the optical axis L, and a first driving mechanism 76 that moves the first optical system holding member 72 along the optical axis L.

The first optical system holding member 72 has a cylindrical shape as a whole, and comprises a lens holding portion inside the first optical system holding member 72. The first wide-angle lens 20*a*, the second wide-angle lens 20*b*, the third wide-angle lens 20*c*, and the fourth wide-angle lens 20*d* composing the first optical system 20 are held by this lens holding portion.

The first optical system holding member 72 comprises a stop holding portion between the lens holding portion of the second wide-angle lens 20*b* and the lens holding portion of the third wide-angle lens 20*c*. The first stop 50 is held by the stop holding portion and integrated with the first optical system 20.

The first guide mechanism 74 is configured to comprise a first guide shaft 74A, a first guide sleeve 74B that slides along the first guide shaft 74A, and a first guide arm 74C that connects the first guide sleeve 74B and the first optical system holding member 72.

The first guide shaft 74A has a bar shape and is disposed in parallel with the optical axis L. The lens barrel 12 comprises a support portion that supports the first guide shaft 74A. Both ends of the first guide shaft 74A are supported by the support portions, and arranged in parallel with the optical axis L.

The first guide sleeve 74B is provided so as to be slidable along the first guide shaft 74A by being fitted into the first guide shaft 74A. Since the first guide shaft 74A is disposed along the optical axis L, the first guide sleeve 74B slides along the optical axis L.

The first guide arm 74C connects the first guide sleeve 74B and the first optical system holding member 72. As a result, the first optical system holding member 72 is supported so as to be movable along the optical axis L.

The first driving mechanism 76 is configured to comprise a first screw bar 76A that is composed of a so-called feed screw mechanism, a first nut 76B, a first driving arm 76C that connects the first nut 76B and the first optical system holding member 72, and a first optical system driving motor 76D.

The first screw bar 76A is disposed in parallel with the optical axis L. The lens barrel 12 comprises a support portion that rotatably supports the first guide shaft 74A. Both ends of the first screw bar 76A are supported by the support portions, and are arranged in parallel to the optical axis L.

The first nut 76B is provided so as to be movable along the first screw bar 76A by being fitted into the first screw bar 76A. Since the first screw bar 76A is disposed along the optical axis L, the first nut 76B moves along the optical axis L.

The first driving arm 76C connects the first nut 76B and the first optical system holding member 72. As a result, the first optical system holding member 72 moves together with the first nut 76B.

The first optical system driving motor 76D is provided on the lens barrel 12, and rotationally drives the first screw bar 76A.

In the first optical system driving section 70 configured as described above, in a case where the first optical system driving motor 76D is driven, the first screw bar 76A rotates. In a case where the first screw bar 76A rotates, the first nut 76B moves along the first screw bar 76A. As a result, the first optical system holding member 72 connected to the first nut 76B moves along the optical axis L, and the first optical system 20 and the first stop 50 held by the first optical system holding member 72 move along the optical axis L.

Figure 12A:
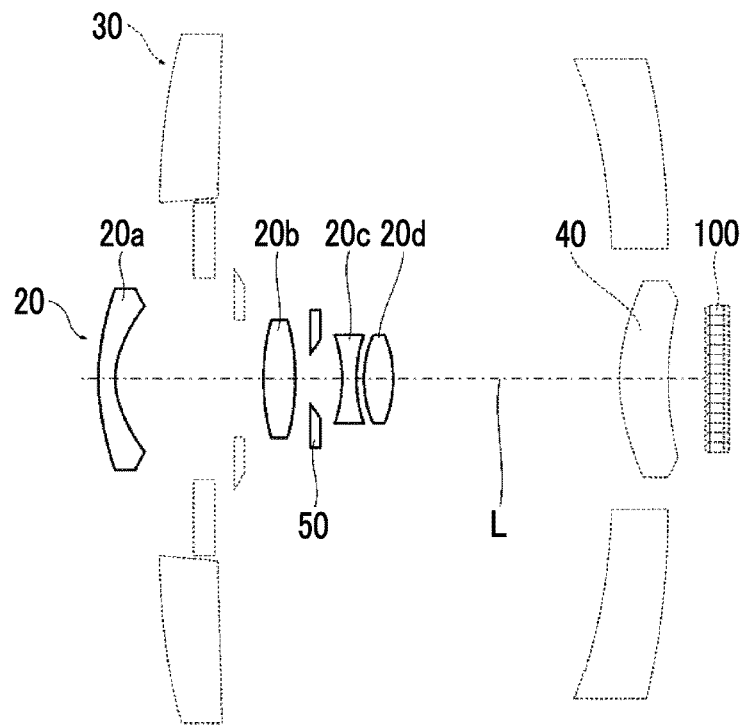
FIGS. 12A and 12B are explanatory diagrams of the operation of the first optical system driven by the first optical system driving section.
Figure 12B:
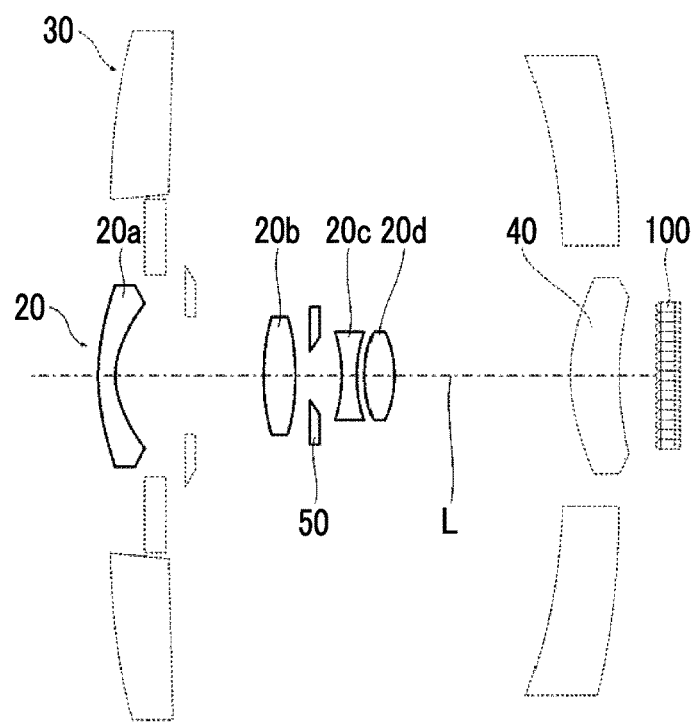

FIGS. 12A and 12B are explanatory diagrams of the operation of the first optical system driven by the first optical system driving section.

As shown in the drawing, the first optical system 20 and the first stop 50 integrally move back and forth on the optical axis L. At this time, the first optical system 20 and the first stop 50 move on the optical axis L independently of the second optical system 30 and the second stop 60.

<Second Optical System Driving Section>

The second optical system driving section 80 integrally moves the second optical system 30 and the second stop 60 along the optical axis L.

Figure 13:
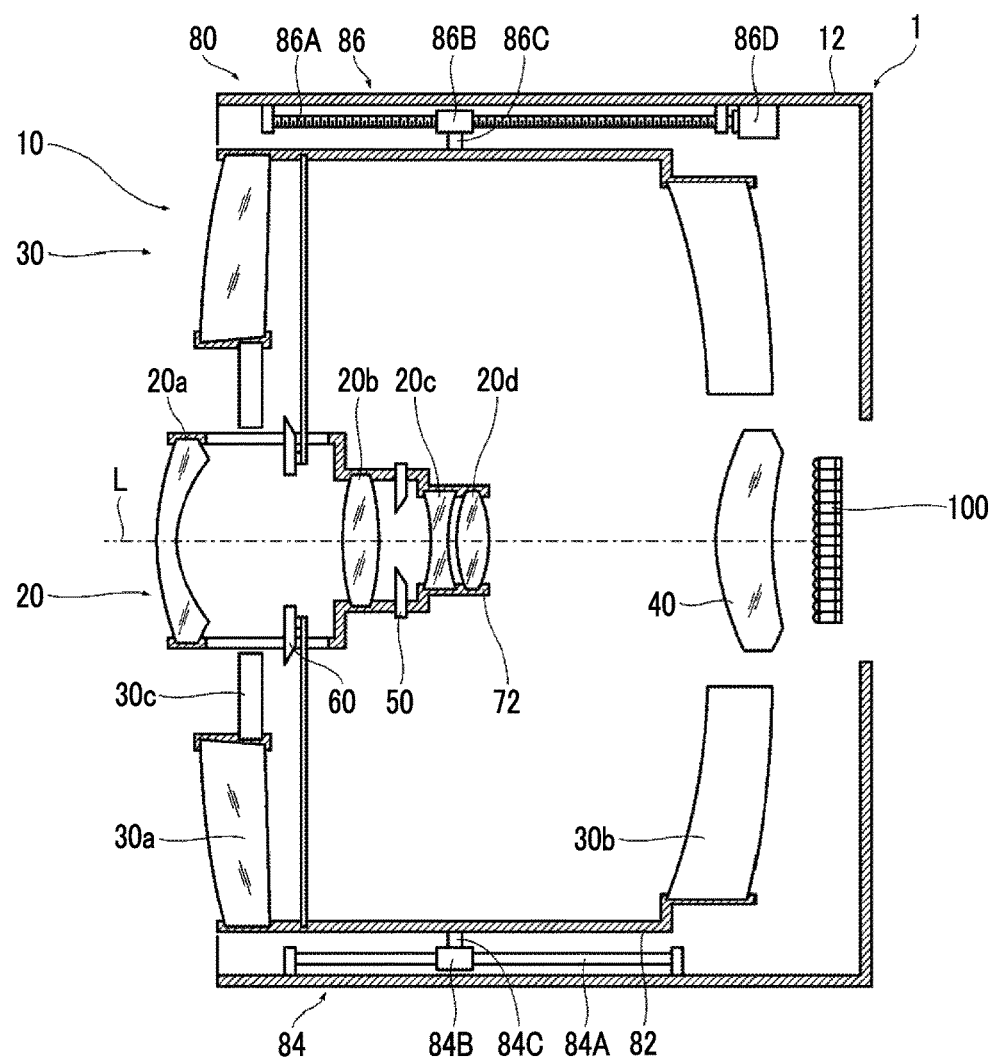
FIG. 13 is a cross-sectional view illustrating a schematic configuration of a second optical system driving section.

FIG. 13 is a cross-sectional view illustrating a schematic configuration of the second optical system driving section.

The second optical system driving section 80 is configured to comprise a second optical system holding member 82 that holds the second stop 60 and the lens groups composing the second optical system 30, a second guide mechanism 84 that guides the second optical system holding member 82 along the optical axis L, and a second driving mechanism 86 that moves the second optical system holding member 82 along the optical axis L.

The second optical system holding member 82 has a cylindrical shape as a whole, and comprises a lens holding portion and a mirror holding portion inside the second optical system holding member 82. The first telephoto lens 30*a*, the first telephoto mirror 30*b*, and the second telephoto mirror 30*c* composing the second optical system 30 are held by the lens holding portion and the mirror holding portion.

Further, the second optical system holding member 82 comprises a stop holding portion inside thereof. In the second stop 60, the outer frame 64B is held by the stop holding portion, and integrated with the second optical system 30.

The second guide mechanism 84 is configured to comprise a second guide shaft 84A, a second guide sleeve 84B that slides along the second guide shaft 84A, and a second guide arm 84C that connects the second guide sleeve 84B and the second optical system holding member 82.

The second guide shaft 84A has a bar shape and is disposed in parallel with the optical axis L. The lens barrel 12 comprises a support portion that supports the second guide shaft 84A. Both ends of the second guide shaft 84A are supported by the support portions and arranged in parallel to the optical axis L.

The second guide sleeve 84B is provided so as to be slidable along the second guide shaft 84A by being fitted into the second guide shaft 84A. Since the second guide shaft 84A is disposed along the optical axis L, the second guide sleeve 84B slides along the optical axis L.

The second guide arm 84C connects the second guide sleeve 84B and the second optical system holding member 82. Thereby, the second optical system holding member 82 is supported so as to be movable along the optical axis L.

The second driving mechanism 86 is configured to comprise a second screw bar 86A that is composed of a so-called feed screw mechanism, a second nut 86B, a second driving arm 86C that connects the second nut 86B and the second optical system holding member 82, and a second optical system driving motor 86D.

The second screw bar 86A is disposed parallel to the optical axis L. The lens barrel 12 comprises a support portion that rotatably supports the second guide shaft 84A. Both ends of the second screw bar 86A are supported by the support portions, and are arranged in parallel to the optical axis L.

The second nut 86B is provided so as to be movable along the second screw bar 86A by being fitted into the second screw bar 86A. Since the second screw bar 86A is disposed along the optical axis L, the second nut 86B moves along the optical axis L.

The second driving arm 86C connects the second nut 86B and the second optical system holding member 82. As a result, the second optical system holding member 82 moves together with the second nut 86B.

The second optical system driving motor 86D is provided on the lens barrel 12 and rotationally drives the second screw bar 86A.

In the second optical system driving section 80 configured as described above, in a case where the second optical system driving motor 86D is driven, the second screw bar 86A rotates. In a case where the second screw bar 86A rotates, the second nut 86B moves along the second screw bar 86A. As a result, the second optical system holding member 82 connected to the second nut 86B moves along the optical axis L, and the second optical system 30 and the second stop 60 held by the second optical system holding member 82 move along the optical axis L.

Figure 14A:
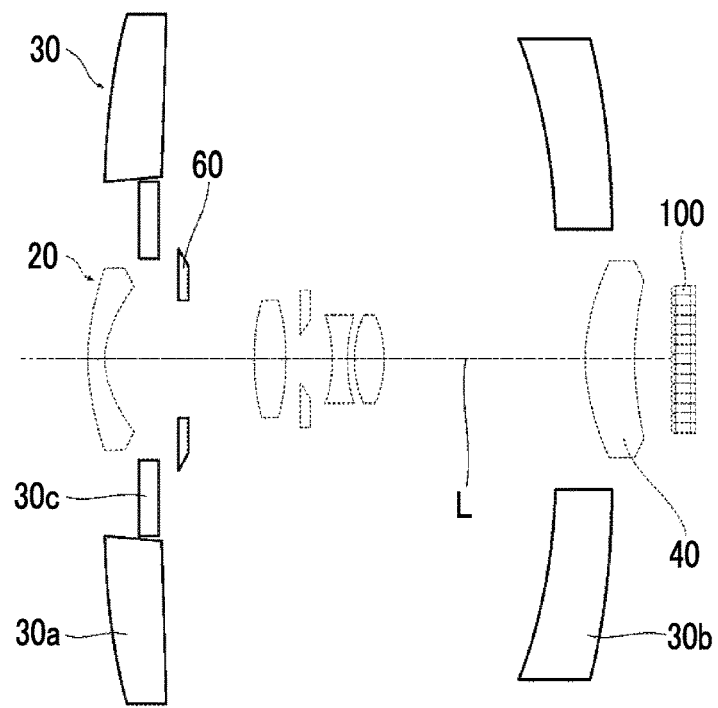
FIGS. 14A and 14B are explanatory diagrams of the operation of the second optical system driven by the second optical system driving section.
Figure 14B:
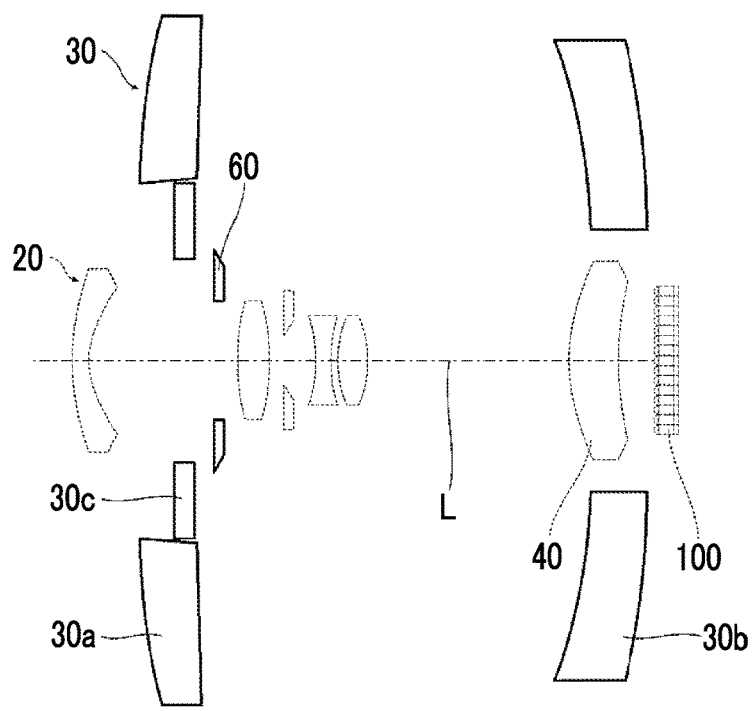

FIGS. 14A and 14B are explanatory diagrams of the operation of the second optical system driven by the second optical system driving section.

As shown in the drawing, the second optical system 30 and the second stop 60 integrally move back and forth on the optical axis L. At this time, the second optical system 30 and the second stop 60 move on the optical axis L independently of the first optical system 20 and the first stop 50.

<<Details of Image Sensor>>

Figure 15:
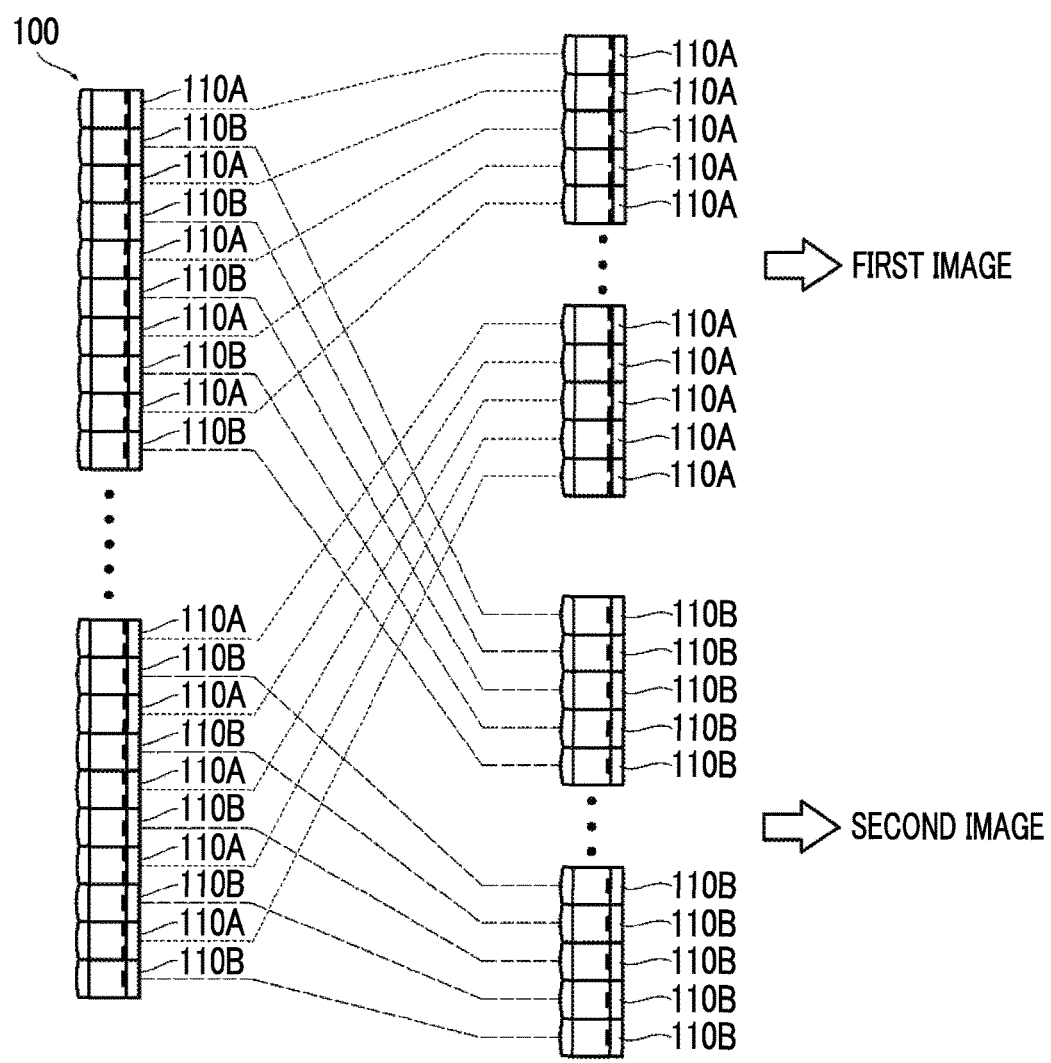
FIG. 15 is a schematic configuration diagram of an image sensor.

FIG. 15 is a schematic configuration diagram of the image sensor.

The image sensor 100 comprises a plurality of pixels composed of photoelectric conversion elements two-dimensionally arranged, respectively pupil-divides rays incident through the first optical system 20 and the second optical system 30, and selectively receives the rays by the respective pixels. Therefore, the pixels composing the image sensor 100 include first pixels 110A that selectively receive the light passing through the first optical system 20 and second pixels 110B that selectively receive the light passing through the second optical system 30. The first pixels 110A and the second pixels 110B are alternately arranged.

Figure 16:
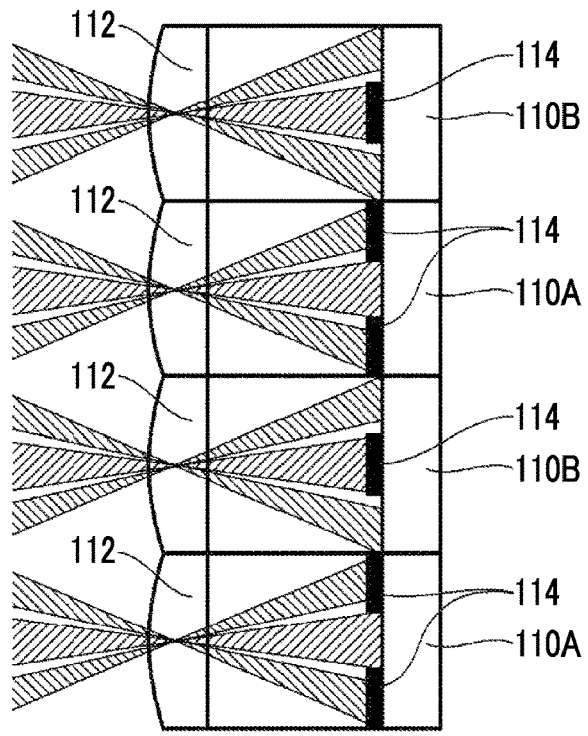
FIG. 16 is a conceptual diagram of a configuration in which rays incident through the first optical system and the second optical system are pupil-divided and selectively received by each pixel.

FIG. 16 is a conceptual diagram of a configuration in which rays incident through the first optical system and the second optical system are pupil-divided and selectively received by each pixel.

In the image sensor 100, each pixel comprises a microlens 112 and a light blocking mask 114.

The microlens 112 is disposed in front of the photoelectric conversion element. The microlens 112 composes a pupil image of the first optical system 20 and the second optical system 30 on the photoelectric conversion element.

The light blocking mask 114 is disposed between the microlens 112 and the photoelectric conversion element. The light blocking mask 114 blocks a part of light passing through the microlens 112. The light blocking mask 114 of the first pixel 110A has an annular shape and blocks light passing through the second optical system 30. The light blocking mask 114 of the second pixel 110B has a circular shape and blocks light passing through the first optical system 20.

The image sensor 100 configured as described above is configured such that each pixel has a different sensitivity depending on the incident angle of light. That is, each pixel is configured with angular directivity. The first pixels 110A selectively receive light passing through the first optical system 20, and the second pixels 110B selectively receive light passing through the second optical system 30. Therefore, it is possible to acquire an image signal of an image obtained through the first optical system 20 by acquiring an image signal of the first pixels 110A, and it is possible to acquire an image signal of an image obtained through the second optical system 30 by acquiring an image signal of the second pixels 110B.

In a case of acquiring a color image, the first pixels 110A and the second pixels 110B comprise color filters. The color filters are arranged in a prescribed array. For example, color filters of three colors of red (R), green (G), and blue (B) are arranged in a Bayer array. Thereby, a color image can be acquired.

<<Operation of Imaging Unit>>

The operation of the imaging unit 1 of the present embodiment configured as described above is as follows.

<Focus Adjustment>

Focus adjustment is independently performed on each of the first optical system 20 and the second optical system 30 composing the lens device 10.

[Focus Adjustment of First Optical System]

The first optical system 20 is driven by the first optical system driving motor 76D, thereby performing focus adjustment.

In a case where the first optical system driving motor 76D is driven, the first optical system holding member 72 moves back and forth along the optical axis L. The first optical system holding member 72 holds a wide-angle lens group (the first wide-angle lens 20a, the second wide-angle lens 20b, the third wide-angle lens 20c, and the fourth wide-angle lens 20d), and the first stop 50 composing the first optical system 20. Therefore, by moving the first optical system holding member 72 back and forth along the optical axis L, as shown in FIG. 12, the first stop 50 and the wide-angle lens group composing the first optical system 20 integrally move back and forth along the optical axis L. Thereby, the focus of the first optical system 20 is adjusted.

[Focus Adjustment of the Second Optical System]

The second optical system 30 is driven by the second optical system driving motor 86D, thereby performing focus adjustment.

In a case where the second optical system driving motor 78D is driven, the second optical system holding member 82 moves back and forth along the optical axis L. The second optical system holding member 82 holds a telephoto lens group (the first telephoto lens 30a, the first telephoto mirror 30b, and the second telephoto mirror 30c) and the second stop 60 composing the second optical system 30. Accordingly, by moving the second optical system holding member 82 back and forth along the optical axis L, as shown in FIG. 14, the second stop 60 and the wide-angle lens group composing the second optical system 30 integrally move back and forth along the optical axis L. Thereby, the focus of the second optical system 30 is adjusted.

<Light Amount Adjustment>

The light amount of each of the first optical system 20 and the second optical system 30 composing the lens device 10 is independently adjusted.

[Adjustment of Light Amount of First Optical System]

The light amount of light passing through the first optical system 20 is adjusted by adjusting the aperture amount of the first stop 50.

The aperture amount of the first stop 50 is adjusted by swinging the first stop blade swing driving member 56. In a case where the first actuator which is not shown is driven to swing the first stop blade swing driving member 56, the respective first stop blades 52 composing the first light blocking section 58 are synchronously swung. As a result, the inner diameter of the first light blocking section 58 having an annular shape increases or decreases, and thereby the aperture amount of the first stop 50 is adjusted. At this time, in the first stop 50, the light blocking region expands from the outside to the inside, and thereby the aperture amount is adjusted.

[Adjustment of Light Amount of Second Optical System]

The light amount of light passing through the second optical system 30 is adjusted by adjusting the aperture amount of the second stop 60.

The aperture amount of the second stop 60 is adjusted by swinging the second stop blade swing driving member 66. In a case where the second actuator which is not shown is driven to swing the second stop blade swing driving member 66, the respective second stop blades 62 composing the second light blocking section 68 are synchronously swung. As a result, the outer diameter of the second light blocking section 68 having an annular shape increases or decreases, and thereby the aperture amount of the second stop 60 is adjusted. At this time, in the second stop 60, the light blocking region expands from the outside to the inside, and thereby the aperture amount is adjusted.

<Image Capture>

The light passing through the first optical system 20 and the second optical system 30 of the lens device 10 is incident on the image sensor 100. The image sensor 100 selectively receives light, which passes through the first optical system 20, by the first pixels 110A, and selectively receives light, which passes through the second optical system 30, by the second pixels 110B. Therefore, it is possible to acquire an image signal of an image obtained through the first optical system 20 by acquiring an image signal of the first pixels 110A, and it is possible to acquire an image signal of an image obtained through the second optical system 30 by acquiring an image signal of the second pixels 110B.

As described above, according to the imaging unit 1 of the present embodiment, it is possible to simultaneously capture two images having different imaging characteristics.

Further, according to the lens device 10 of the present embodiment, focus adjustment is performed on the first optical system 20 and the second optical system 30 independently of each other. Thereby, it is possible to capture images accurately focused by both the first optical system 20 and the second optical system 30.

Further, according to the lens device 10 of the present embodiment, the first optical system 20 and the second optical system 30 comprise stops, and the light amounts thereof can be adjusted independently of each other. Thereby, it is possible to capture images with appropriate exposures through both the first optical system 20 and the second optical system 30.

Furthermore, according to the lens device 10 of the present embodiment, in a case of adjusting the light amounts of the first optical system 20 and the second optical system 30 by the stops, the boundary between the pupil regions of the first optical system 20 and the second optical system 30 is blocked from light, and the light amount of light is adjusted. Thus, in a case where the image sensor 100 receives light, it is possible to improve separability of light received by the first pixels 110A and the second pixels 110B. Thereby, interference can be prevented.

It should be noted that interference refers to a state in which optical signal components from the first optical system 20 and the second optical system 30 are mixed and received by each pixel. In a case where interference occurs, the optical signal components from the second optical system 30 are mixed and received in the first pixels 110A, and the optical signal components from the first optical system 20 are mixed and received in the second pixels 110B. In a case where this interference occurs, the image of the second optical system 30 is superimposed on the image read from the first pixels 110A, and the image of the first optical system 20 is superimposed on the image read from the second pixels 110B.

By blocking light at the boundary between the pupil regions of the first optical system 20 and the second optical system 30 as in the lens device 10 of the present embodiment, it is possible to improve separability of the light received by the first pixels 110A and the second pixels 110B, and thus interference can be effectively prevented. This point will be described in detail.

Figure 17:
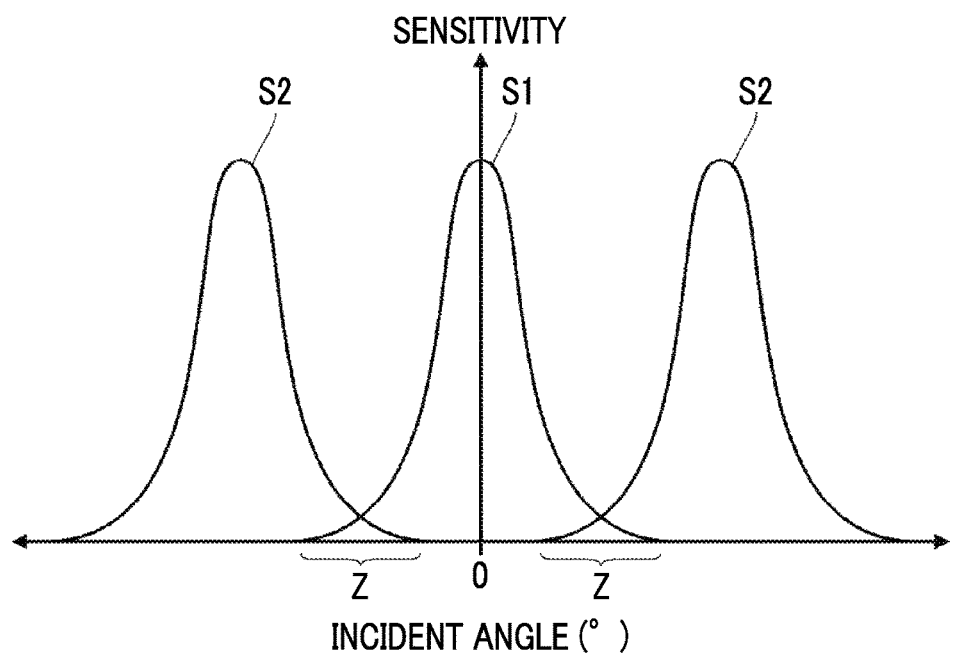
FIG. 17 is a diagram illustrating incident angle sensitivity characteristics of first and second pixels which are adjacent.

FIG. 17 is a diagram illustrating incident angle sensitivity characteristics of first and second pixels which are adjacent.

In FIG. 17, the horizontal axis represents the incident angle of light, and the vertical axis represents the sensitivity of the photoelectric conversion element composing the pixel. The incident angle of light, which is incident vertically to the pixel, is set to 0 degree(°).

In FIG. 17, the reference symbol S1 indicates a graph of incident angle sensitivity characteristics of the first pixels 110A, and the reference symbols S2 indicate graphs of incident angle sensitivity characteristics of the second pixels 110B. In this case, interference occurs in each incident angle region Z where graphs overlap with each other.

Figure 18A:
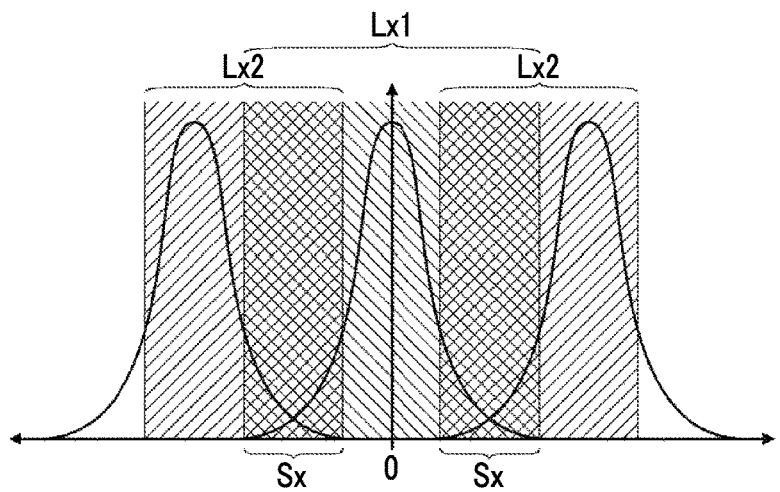
FIGS. 18A to 18C are views for explaining an effect of interference prevention performed by a stop.
Figure 18B:
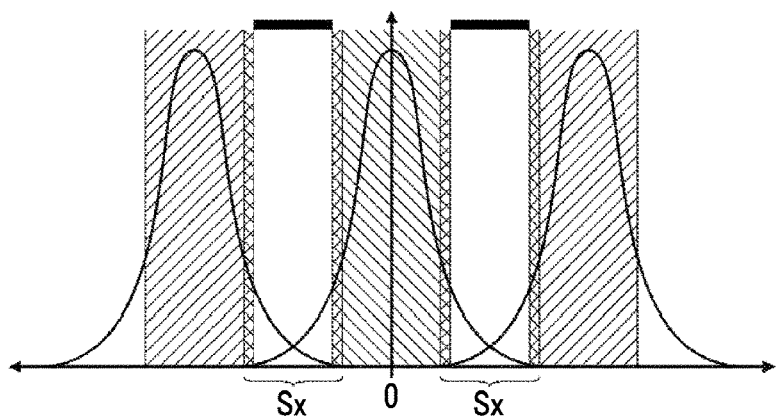
Figure 18C:
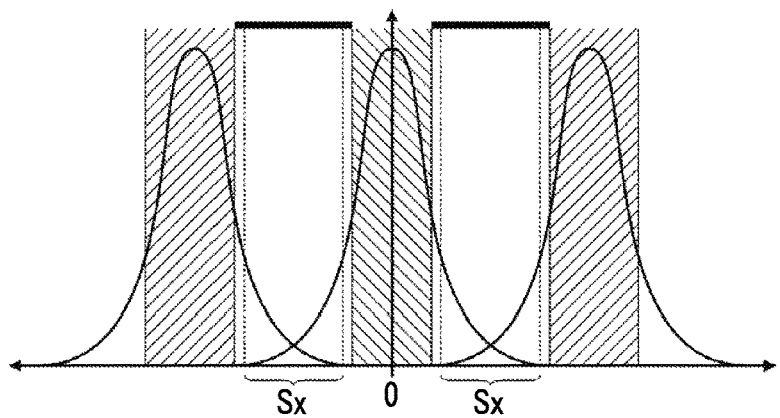

FIGS. 18A to 18C are views for explaining an effect of interference prevention performed by a stop.

FIG. 18A shows the light receiving state of each pixel in a case where there is no stop. Rays, which are incident on the first pixels 110A and the second pixels 110B through the first optical system 20, are indicated by a right oblique line as Lx1, and rays, which are incident on the first pixels 110A and the second pixels 110B through the second optical system 30, are indicated by a left oblique line as Lx2. In this case, interference occurs in each incident angle region Sx where both intersect.

FIG. 18B shows the light receiving state of each pixel in a case where there is a stop. By providing a stop at the boundary between the pupil regions of the first optical system 20 and the second optical system 30 so as to block light in the regions, it is possible to block the light of the incident angle at which interference occurs.

FIG. 18C shows the light receiving state of each pixel in a case where the aperture of the stop is further reduced from the state shown in FIG. 18B, that is, in a case where the light blocking region is further increased. As shown in the drawing, by increasing the light blocking region, it is possible to further block the light of the incident angle at which interference occurs. In other words, the more the aperture of the stop is reduced, the more the light separability can be improved. Thus, interference can be prevented more effectively.

As described above, according to the lens device 10 of the present embodiment, by providing a stop, it is possible to arbitrarily adjust the light amount, and it is possible to eliminate an effect of interference.

Modification Example of First Embodiment

<Another Example of First Stop and Second Stop>

The stops composing the first stop and the second stop may be composed of liquid crystal elements.

[First Stop Composed of Liquid Crystal Elements]

Figure 19:
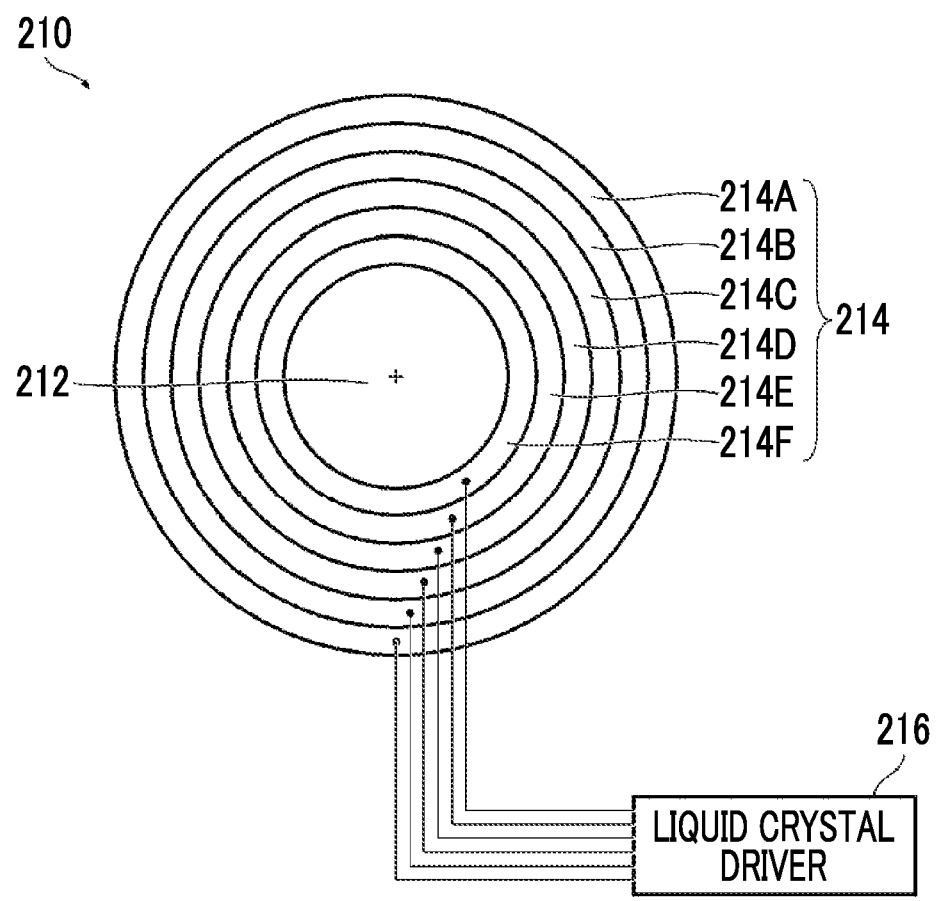
FIG. 19 is a front view illustrating an example of the first stop composed of liquid crystal elements.

FIG. 19 is a front view illustrating an example of the first stop composed of liquid crystal elements.

The first stop 210 of the present example is composed of liquid crystal elements such as super twisted nematic liquid crystal (STN), dual scan super twisted nematic liquid crystal (DSTN), or thin film transistor liquid crystal (TFT).

The first stop 210 has a discoid shape. The first stop 210 comprises a circular light transmitting region 212 in the central portion, and an annular light transmitting/blocking switch region 214 in the outer peripheral portion.

The light transmitting region 212 is a region which has translucency and through which light is constantly transmitted.

The light transmitting/blocking switch region 214 is a region where it is possible to arbitrarily switch between a light transmitting state in which light is transmitted and a light blocking state in which light is blocked. The light transmitting/blocking switch region 214 composes a first light blocking section in the light blocking state. The light transmitting/blocking switch region 214 is configured such that a plurality of annular regions 214A to 214F is concentrically combined. Each of the annular regions 214A to 214F is configured to be capable of individually switching between the light transmitting state and the light blocking state.

Each of the annular regions 214A to 214F composing the light transmitting/blocking switch region 214 is independently controlled by a liquid crystal driver 216, and is set in the light transmitting state or the light blocking state.

In the first stop 210 configured as described above, the aperture amount is adjusted by individually controlling the states of the respective annular regions 214A to 214F composing the light transmitting/blocking switch region 214.

Figure 20A:
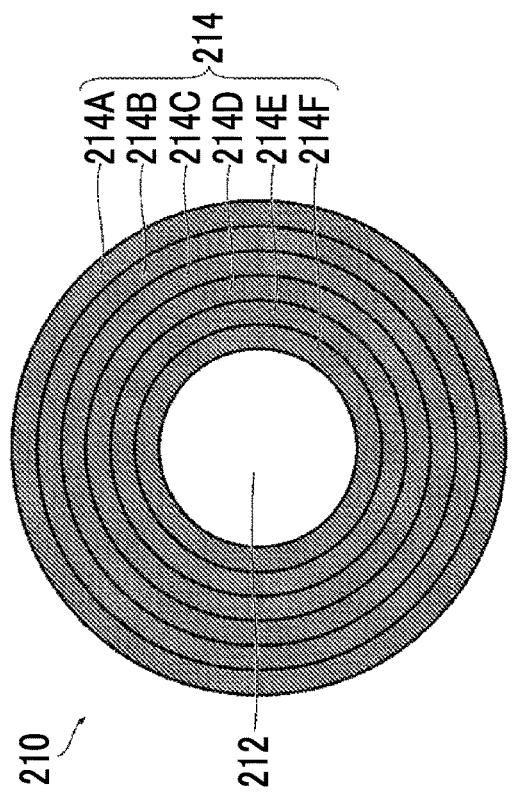
FIGS. 20A and 20B are explanatory diagrams of the operation of the first stop composed of liquid crystal elements.
Figure 20B:
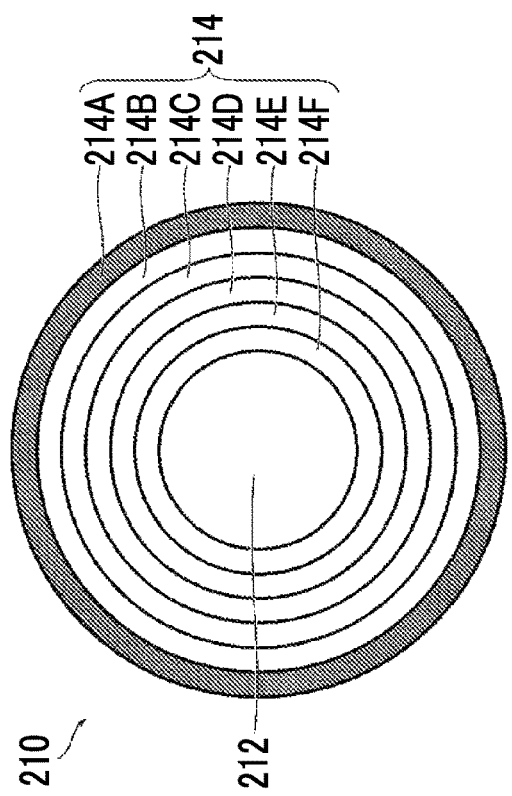

FIGS. 20A and 20B are explanatory diagrams of the operation of the first stop composed of liquid crystal elements. FIG. 20A shows a state in which the aperture of the stop is reduced by one stop, and FIG. 20B shows a state in which the aperture of the stop is minimized.

As shown in FIG. 20A, in a case where the aperture of the stop is reduced by one stop, the annular region 214A positioned to be closest to the outside of the light transmitting/blocking switch region 214 is set in the light blocking state, and the other annular regions 214B to 214F are set in the light transmitting state.

As shown in FIG. 20B, in a case where the aperture of the stop is minimized, all the annular regions 214A to 214F composing the light transmitting/blocking switch region 214 are in the light blocking state.

In this manner, in a case where the aperture of the first stop 210 is reduced, the annular regions 214A to 214F composing the light transmitting/blocking switch region 214 are blocked from light in order from the outside. As a result, the light blocking region expands inward.

[Second Stop Composed of Liquid Crystal Elements]

Figure 21:
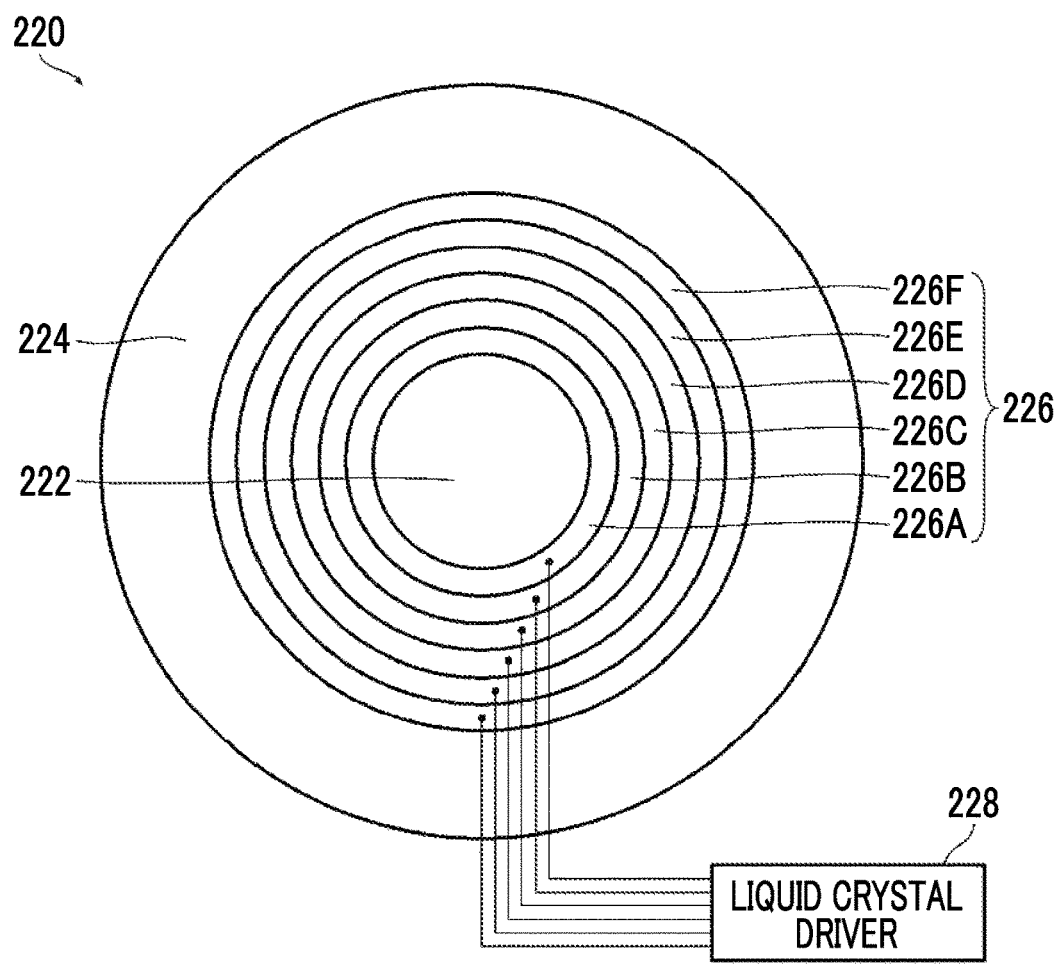
FIG. 21 is a front view illustrating an example of the second stop composed of liquid crystal elements.

FIG. 21 is a front view illustrating an example of the second stop composed of liquid crystal elements.

The second stop 220 of the present example is composed of liquid crystal elements such as STN liquid crystal, DSTN liquid crystal, or TFT liquid crystal.

The second stop 220 has a discoid shape. The second stop 220 comprises a central light transmitting region 222 having a circular shape in the central portion and an outer peripheral light transmitting region 224 having an annular shape in the outer peripheral portion. In addition, an annular light transmitting/blocking switch region 226 is provided between the central light transmitting region 222 and the outer peripheral light transmitting region 224.

The central light transmitting region 222 and the outer peripheral light transmitting region 224 are regions which have translucency and through which light is constantly transmitted.

The light transmitting/blocking switch region 226 is a region where it is possible to arbitrarily switch between the light transmitting state and the light blocking state. The light transmitting/blocking switch region 226 composes a second light blocking section in the light blocking state. The light transmitting/blocking switch region 226 is configured such that a plurality of annular regions 226A to 226F is concentrically combined. Each of the annular regions 226A to 226F is configured to be capable of individually switching between the light transmitting state and the light blocking state.

Each of the annular regions 226A to 226F composing the light transmitting/blocking switch region 226 is independently controlled by a liquid crystal driver 228 and is set in the light transmitting state or the light blocking state.

In the second stop 220 configured as described above, the aperture amount is adjusted by individually controlling the states of the respective annular regions 226A to 226F composing the light transmitting/blocking switch region 226.

Figure 22A:
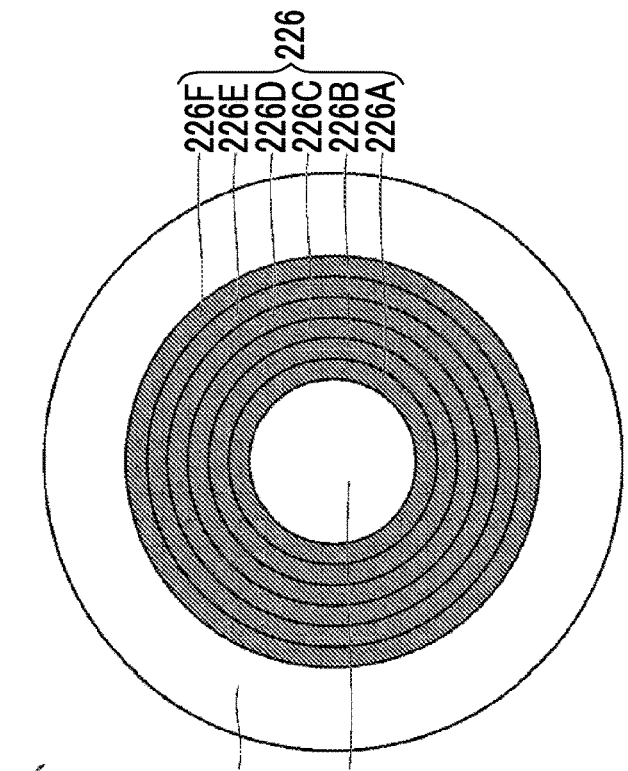
FIGS. 22A and 22B are explanatory diagrams of the operation of the second stop composed of liquid crystal elements.
Figure 22B:
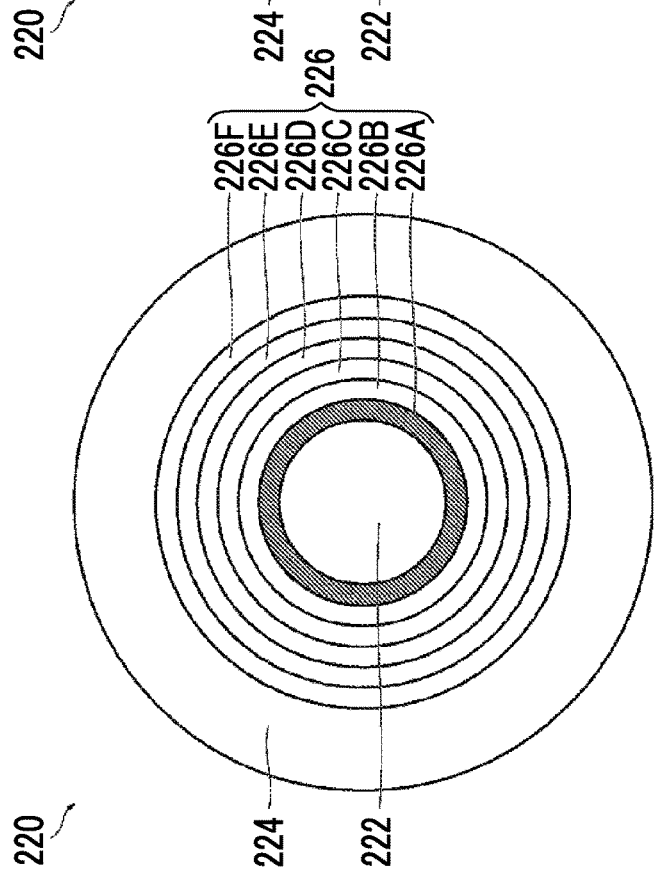

FIGS. 22A and 22B are explanatory diagrams of the operation of the second stop composed of liquid crystal elements. FIG. 22A shows a state in which the aperture of the stop is reduced by one stop, and FIG. 22B shows a state in which the aperture of the stop is minimized.

As shown in FIG. 22A, in a case where the aperture of the stop is reduced by one stop, the annular region 226A positioned to be closest to the inside of the light transmitting/blocking switch region 226 is set in the light blocking state, and the other annular regions 226B to 226F are set in the light transmitting state.

As shown in FIG. 22B, in a case where the aperture of the stop is minimized, all the annular regions 226A to 226F composing the light transmitting/blocking switch region 226 are in the light blocking state.

In this manner, in a case where the aperture of the second stop 220 is reduced, the annular regions 226A to 226F composing the light transmitting/blocking switch region 226 are blocked from light in order from the inside. As a result, the light blocking region expands outward.

Other Examples of First Stop and Second Stop

In the above-mentioned embodiment, the first stop and the second stop may be configured to be operated by actuators, but may be configured to be manually operated. For example, regarding the first stop, a lever may be provided on the first stop blade swing driving member, and the lever may be configured to be manually swung. Similarly, regarding the second stop, a lever may be provided on the second stop blade swing driving member, and the lever may be configured to be manually swung.

In a case where the first stop blade supporting member which composes the first stop blocks light passing through the second optical system, or in a case where the second stop blade supporting member which composes the second stop blocks light passing through the first optical system, it is preferable that these members are composed of a transparent material. Thereby, it is possible to reduce the effect of light blocking by the supporting member.

In the above-mentioned embodiment, in the first stop, the first cam grooves are configured to be provided on the side of the first stop blade swing driving member, and the first cam pins are configured to be provided on the side of the first stop blades. However, the first cam pins may be configured to be provided on the side of the first stop blade swing driving member, and the first cam grooves may be configured to be provided on the side of the first stop blades. Similarly, in the second stop, second cam grooves may be provided on the side of the second stop blade swing driving member, and second cam pins may be provided on the side of the second stop blades.

Second Embodiment

<<Imaging Unit>>

Figure 23:
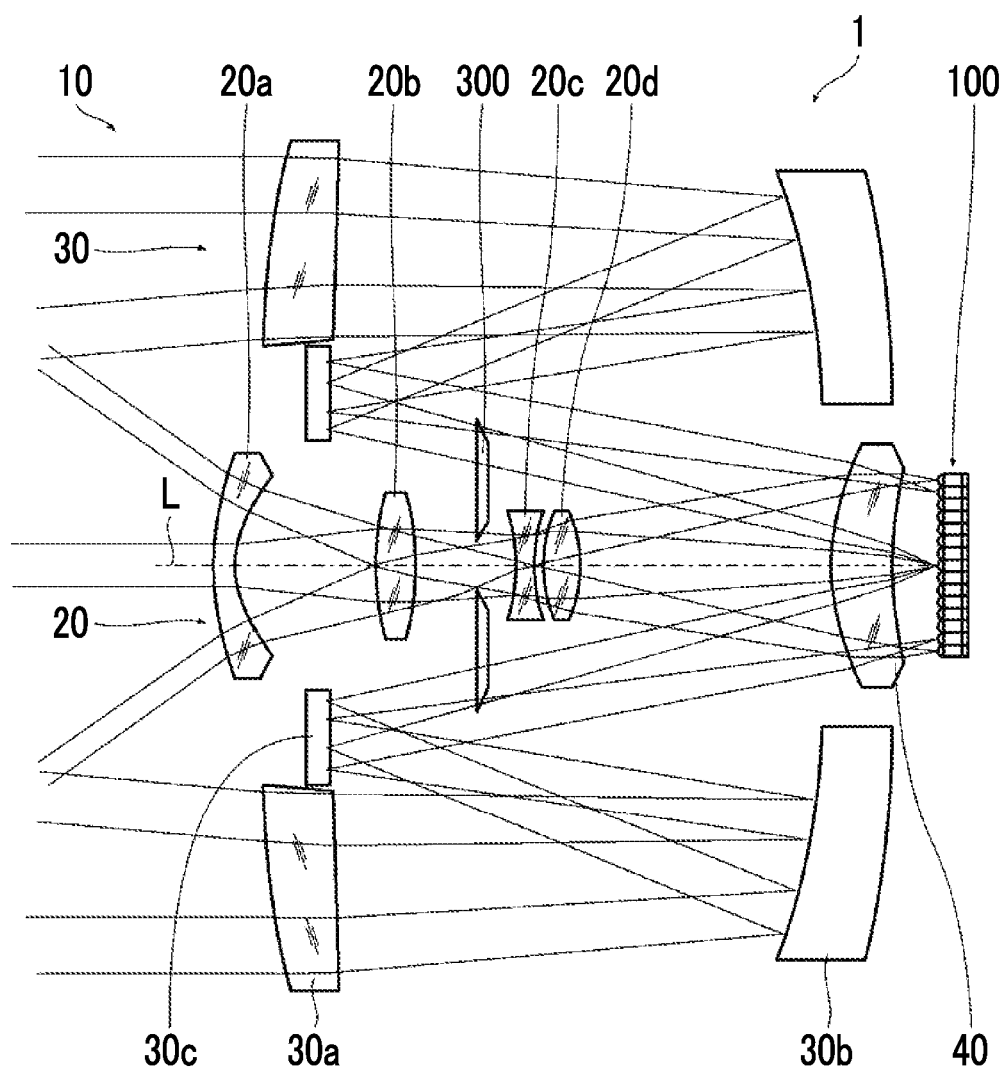
FIG. 23 is a schematic configuration diagram of a second embodiment of an imaging unit.

FIG. 23 is a schematic configuration diagram of a second embodiment of the imaging unit.

In the imaging unit of the present embodiment, a configuration of a lens device is different from that of the imaging unit of the first embodiment. The lens device provided in the imaging unit of the present embodiment is different from the lens device provided in the imaging unit of the first embodiment in that the light amounts of the first optical system and the second optical system are adjusted by one common stop. Therefore, in the following description, only the stop (common stop), which is the difference, will be described.

<Configuration of Common Stop>

The common stop 300 is disposed between the second wide-angle lens 20b and the third wide-angle lens 20c composing the first optical system 20. The common stop 300 is held by the first optical system holding member 72 (refer to FIG. 11), and moves together with the first optical system 20.

Figure 24:
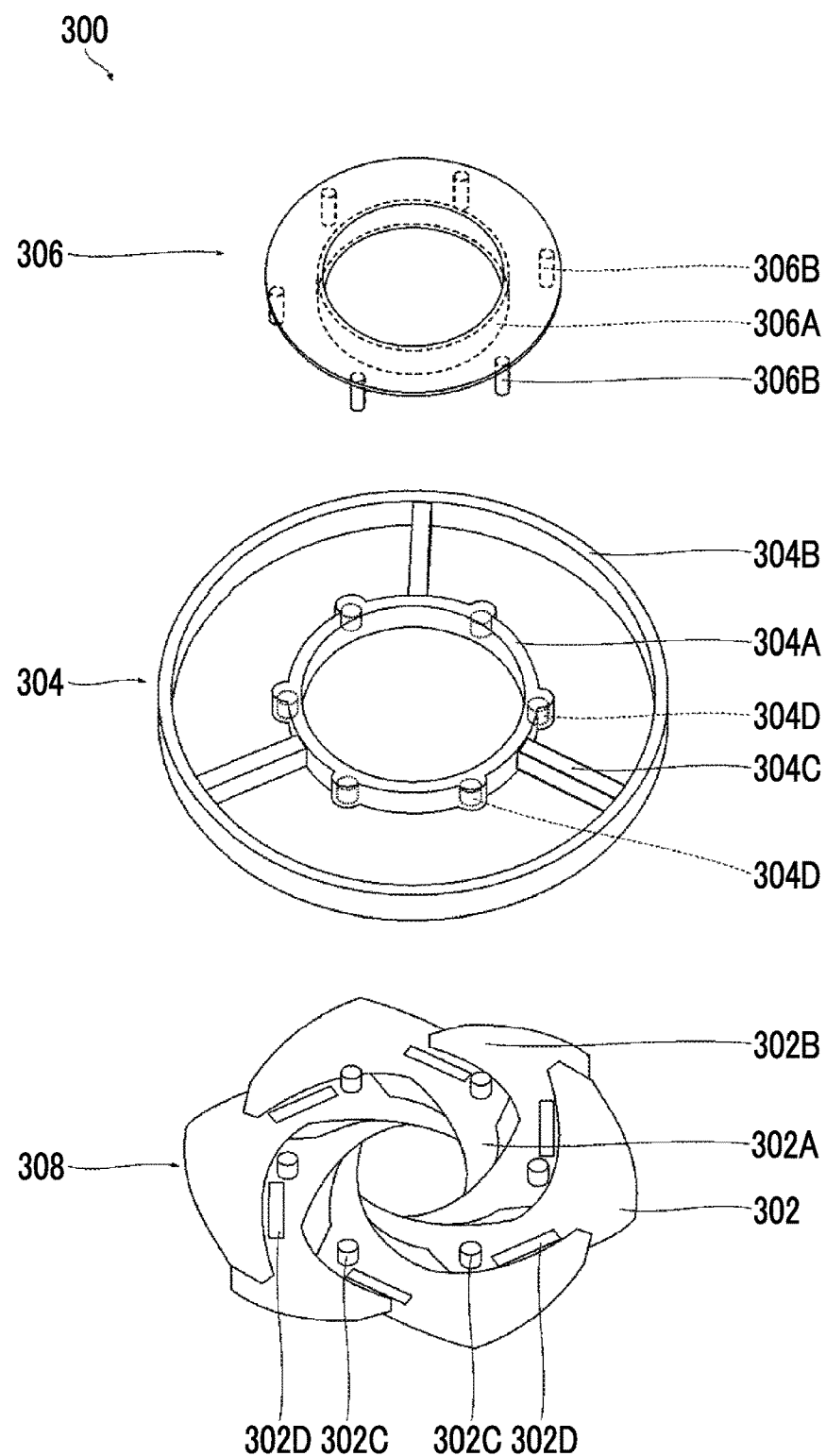
FIG. 24 is an exploded perspective view of a common stop.
Figure 25:
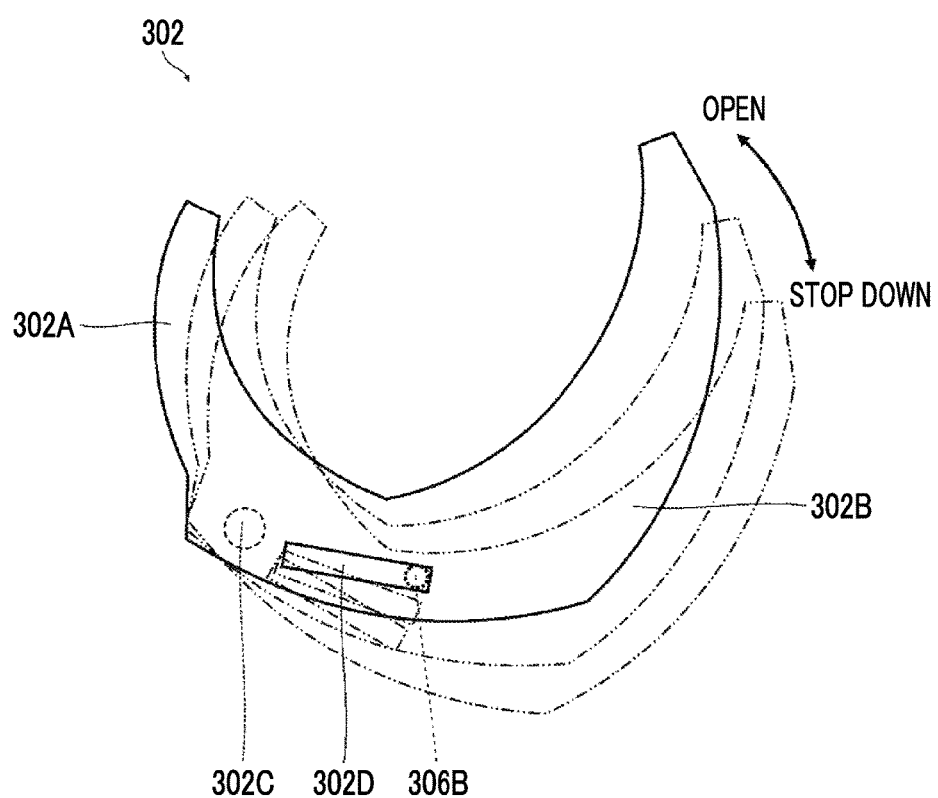
FIG. 25 is a front view of a stop blade composing a common stop.

FIG. 24 is an exploded perspective view of the common stop. FIG. 25 is a front view of a stop blade composing the common stop, and FIG. 26 is a front view illustrating a configuration of arrangement of stop blades.

As shown in FIG. 24, the common stop 300 is configured to mainly comprise a plurality of stop blades 302, a stop blade supporting member 304 that swingably supports the plurality of stop blades 302, a stop blade swing driving member 306 that swings the plurality of stop blades 302 synchronously, and an actuator (not shown in the drawing) that operates the stop blade swing driving member 306.

All the stop blades 302 have the same shape. As shown in FIG. 25, each stop blade 302 has an arc shape as a whole, and has a first blade portion 302A at one end and a second blade portion 302B at the other end. As will be described later, the first blade portion 302A has a function of increasing and decreasing the inner diameter of the common light blocking section 308, and the second blade portion 302B has a function of increasing and decreasing the outer diameter of the common light blocking section 308.

Figure 26:
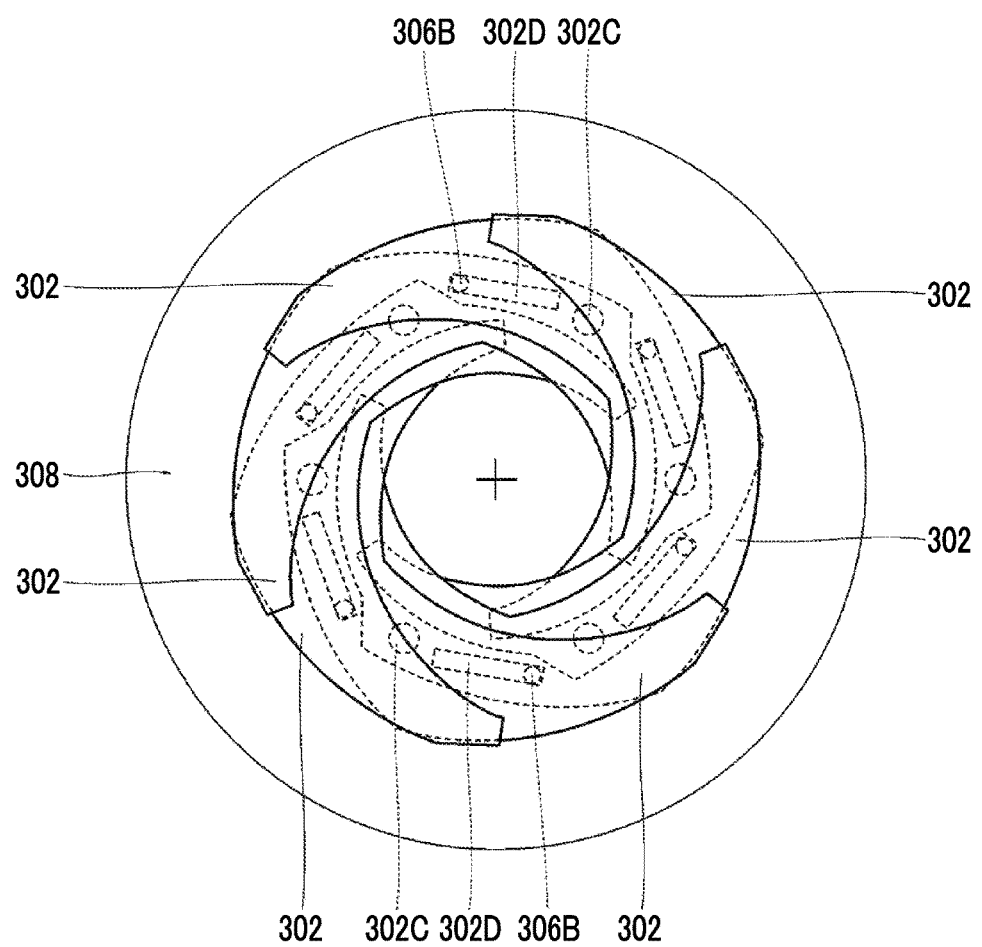
FIG. 26 is a front view illustrating a configuration of arrangement of stop blades.

As shown in FIG. 26, the stop blades 302 are arranged with regular intervals on the same circumference, and arranged such that stop blades 302 adjacent to each other overlap with each other. The stop blades 302 arranged in such a manner form the common light blocking section 308 having an annular shape as a whole. FIG. 26 shows a state in which the common stop 300 is released, that is, a state in which the common stop 300 is fully opened. In this case, the outer diameter of the common light blocking section 308 is minimized, and the inner diameter thereof is maximized.

The stop blade supporting member 304 is disposed coaxially with the common light blocking section 308. As shown in FIG. 24, the stop blade supporting member 304 is configured to comprise an inner frame 304A, an outer frame 304B, three support arms 304C, and bearings 304D. Both the inner frame 304A and the outer frame 304B are composed of annular frames, and are arranged concentrically. The three support arms 304C are arranged radially, and connect the inner frame 304A and the outer frame 304B to each other. The bearings 304D are provided in the inner frame 304A, and are arranged with regular intervals in the circumferential direction. Each bearing 304D composes a fulcrum.

Each swing shaft 302C, which is capable of being fitted into the bearing 304D, is provided at the base end section of each stop blade 302. The swing shaft 302C is disposed between the first blade portion 302A and the second blade portion 302B. Each stop blade 302 is swingably supported by the stop blade supporting member 304 by fitting the swing shaft 302C into the bearing 304D.

The stop blade swing driving member 306 is disposed coaxially with the common light blocking section 308. As shown in FIG. 24, the stop blade swing driving member 306 is composed of an annular plate material, and comprises a fitting portion 306A having an annular shape at the inner peripheral portion thereof. By fitting the fitting portion 306A into the inner peripheral portion of the stop blade supporting member 304, the stop blade swing driving member 306 is disposed coaxially with the stop blade supporting member 304 and the common light blocking section 308, and is supported swingably in the circumferential direction.

The stop blade swing driving member 306 comprises a plurality of cam pins 306B. The cam pins 306B are arranged with regular intervals on the same circumference.

Each of the stop blades 302 comprises a cam groove 302D. The cam pin 306B is fitted into each of the cam grooves 302D. In a case where the cam pin 306B is fitted into each of the cam grooves 302D, the stop blade swing driving member 306 is swung, and then the stop blades 302 swing in conjunction with the motion of the stop blade swing driving member 306.

The cam grooves 302D, the cam pins 306B, and the stop blade swing driving member 306 compose a stop blade driving section for synchronously swinging the stop blades 302.

The actuator, which is not shown, is composed of, for example, a motor, and swings the stop blade swing driving member 306 in the circumferential direction.

<Operation of Common Stop>

Figure 27:
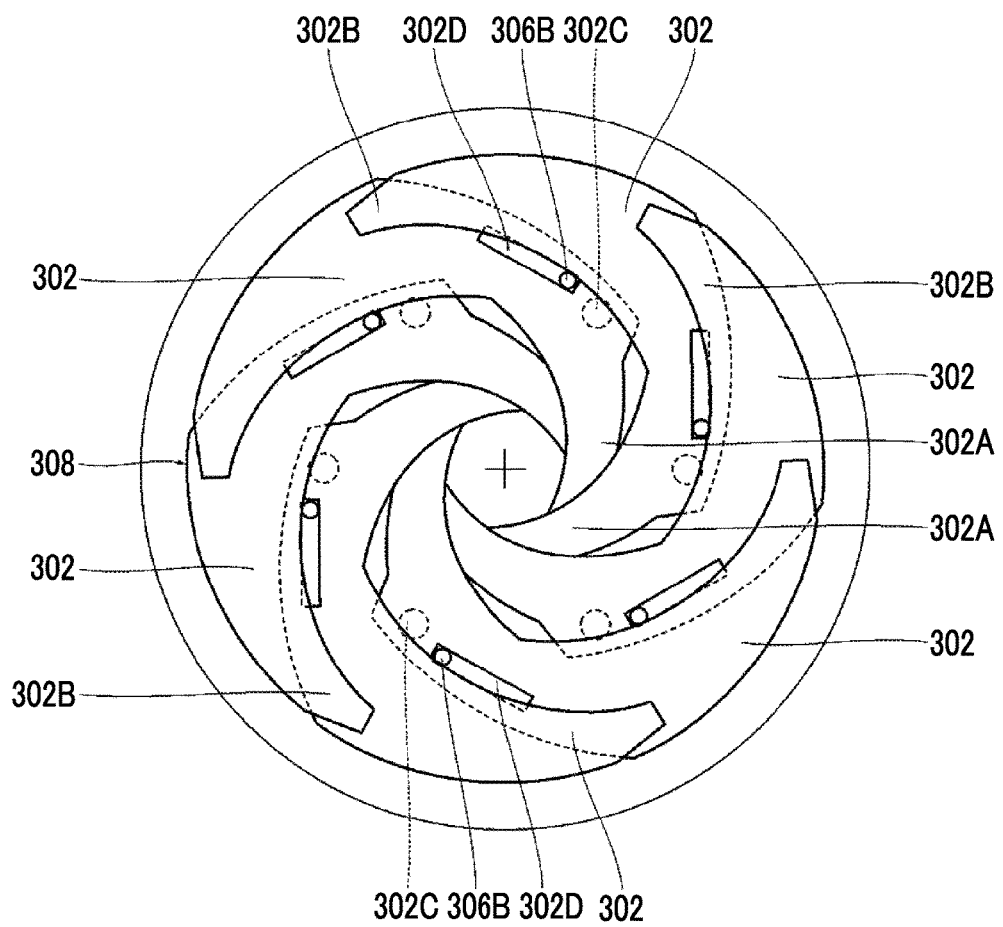
FIG. 27 is an explanatory diagram of the operation of the common stop.

FIG. 27 is an explanatory diagram of the operation of the common stop.

In a case where the stop blade swing driving member 306 is swung, all the stop blades 302 swing synchronously around the bearing 304D as the fulcrum by the action of the cam pins 306B and the cam grooves 302D.

Here, in a case where the stop blade 302 is swung from the open state shown in FIG. 26, as shown in FIG. 27, the first blade portion 302A of each stop blade 302 extends in the inner diameter direction. At the same time, the second blade portion 302B of each stop blade 302 extends in the outer diameter direction. As a result, the inner diameter of the common light blocking section 308 is decreased, and the outer diameter thereof is increased.

In this manner, in a case where the stop blades 302 are swung, the common stop 300 increases or decreases the inner diameter and the outer diameter of the common light blocking section 308. In this case, the inner diameter of the common light blocking section 308 is decreased in conjunction with the increase in outer diameter, and the inner diameter thereof is increased in conjunction with the decrease in outer diameter. Thereby, in the inside region of the common light blocking section 308, by reducing the aperture of the common stop 300, the light blocking region expands from the outside toward the inside, and in the outside region thereof, the light blocking region expands from the inside toward the outside, thereby performing light blocking.

<Incorporation in Lens Device>

As described above, the common stop 300 is disposed between the second wide-angle lens 20*b* and the third wide-angle lens 20*c* composing the first optical system 20. At this time, in the common stop 300, the common light blocking section 308 is disposed so as to block light at the boundary between the pupil regions of the first optical system 20 and the second optical system 30. More specifically, in a state where the stop is released, the common light blocking section 308 is disposed so as to block light at the boundary between the pupil regions of the first optical system 20 and the second optical system 30. Thereby, in a case where the common stop 300 is operated, the rays are narrowed from the outside toward the inside of the first optical system 20, and the rays are narrowed from the inside toward the outside of the second optical system 30.

<Focus Adjustment>

Focus adjustment is independently performed on each of the first optical system 20 and the second optical system 30 composing the lens device 10.

[Focus Adjustment of First Optical System]

Figure 30A:
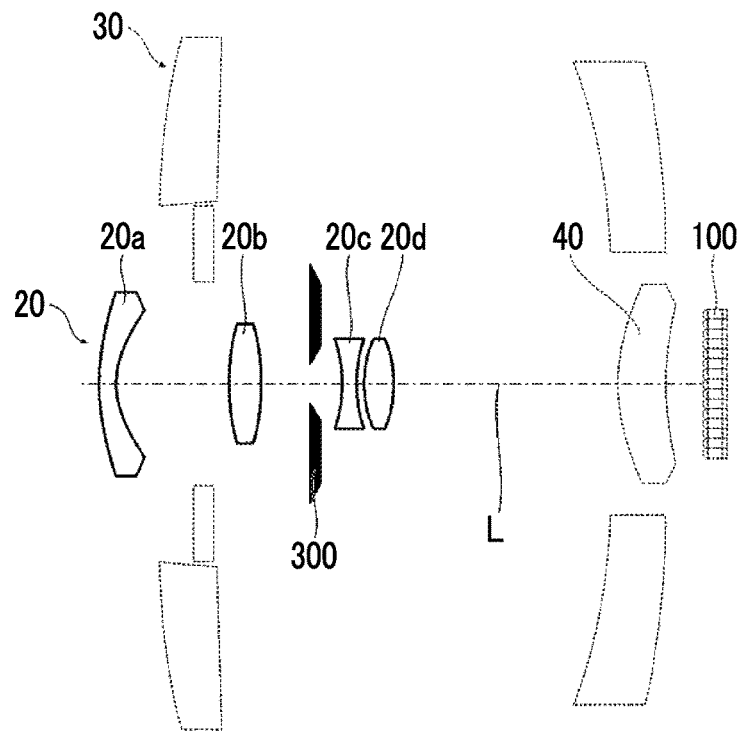
FIGS. 30A and 30B are explanatory diagrams of the operation of the first optical system driven by the first optical system driving section.
Figure 30B:
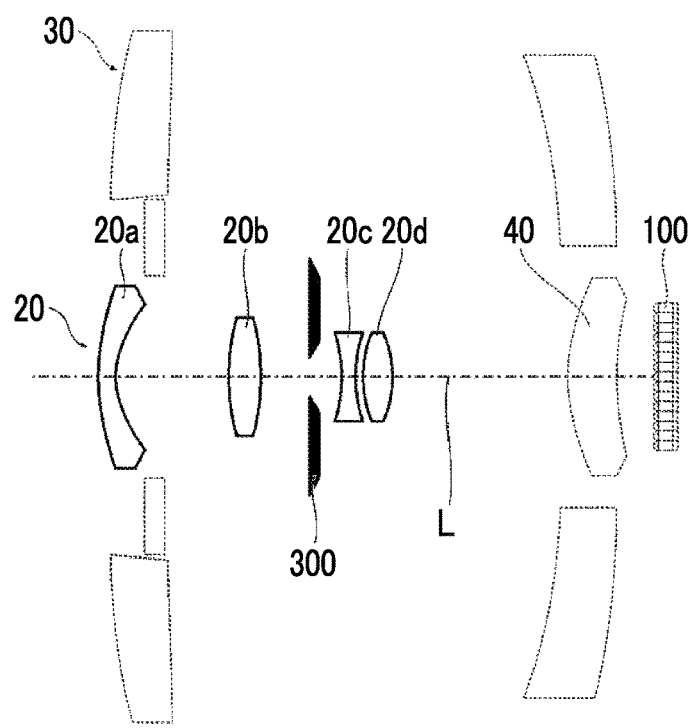

FIG. 30 is an explanatory diagram of the operation of the first optical system driven by the first optical system driving section.

The first optical system 20 is driven by the first optical system driving motor 76D, thereby performing focus adjustment.

In a case where the first optical system driving motor 76D is driven, the first optical system holding member 72 moves back and forth along the optical axis L. The first optical system holding member 72 holds a wide-angle lens group (the first wide-angle lens 20*a*, the second wide-angle lens 20*b*, the third wide-angle lens 20*c*, and the fourth wide-angle lens 20*d*), and the common stop 300 composing the first optical system 20. Therefore, by moving the first optical system holding member 72 back and forth along the optical axis L, as shown in FIG. 30, the common stop 300 and the wide-angle lens group composing the first optical system 20 integrally move back and forth along the optical axis L. Thereby, the focus of the first optical system 20 is adjusted.

[Focus Adjustment of Second Optical System]

Figure 31A:
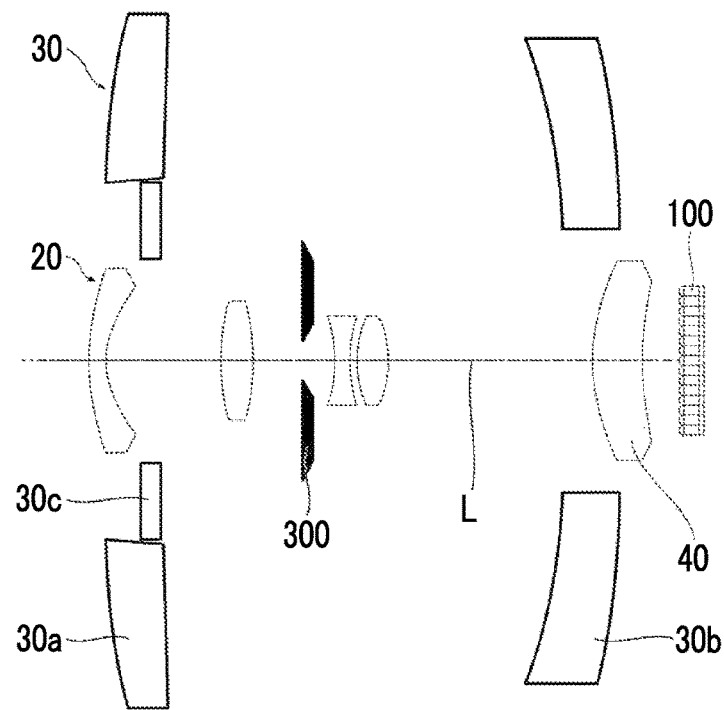
FIGS. 31A and 31B are explanatory diagrams of the operation of the first optical system driven by the second optical system driving section.
Figure 31B:
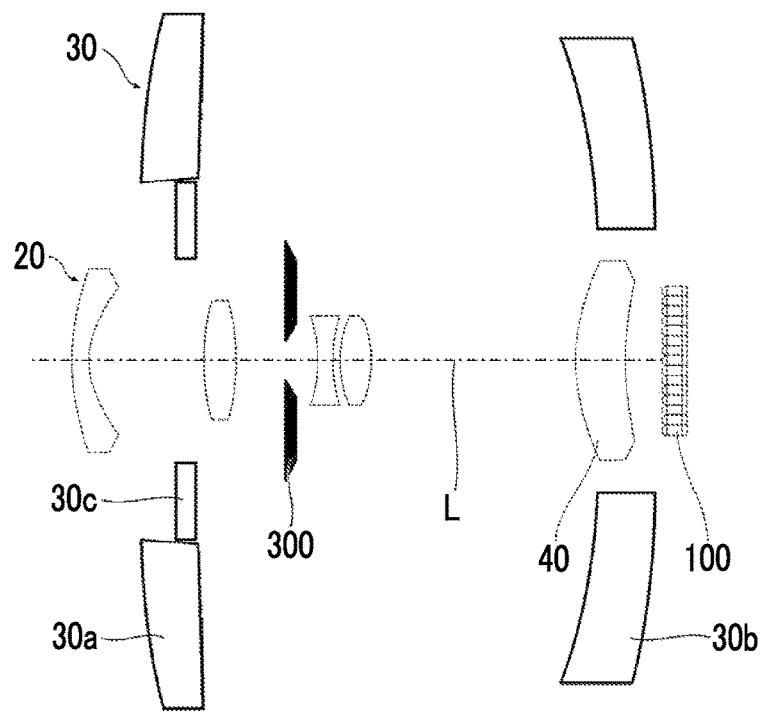

FIG. 31 is an explanatory diagram of the operation of the first optical system driven by the second optical system driving section.

The second optical system 30 is driven by the second optical system driving motor 86D, thereby performing focus adjustment.

In a case where the second optical system driving motor 78D is driven, the second optical system holding member 82 moves back and forth along the optical axis L. The second optical system holding member 82 holds a telephoto lens group (the first telephoto lens 30*a*, the first telephoto mirror 30*b*, and the second telephoto mirror 30*c*) composing the second optical system 30. Accordingly, by moving the second optical system holding member 82 back and forth along the optical axis L, as shown in FIG. 31, the wide-angle lens group composing the second optical system 30 integrally moves back and forth along the optical axis L. Thereby, the focus of the second optical system 30 is adjusted.

As described above, since the common stop 300 is provided in the first optical system holding member 72, even in a case where the second optical system 30 is moved, the common stop 300 does not move.

As described above, according to the lens device of the present embodiment, the light amounts of the first optical system 20 and the second optical system 30 are capable of being adjusted by one common stop. Thereby, the configuration can be simplified.

In addition, since the common stop 300 blocks at the boundary between the pupil regions of the first optical system 20 and the second optical system 30 so as to adjust the light amounts thereof, it is possible to prevent interference even in a case where imaging is performed by using the directivity sensor.

Modification Example of Second Embodiment

<Another Example of Common Stop>

The common stop may be composed of liquid crystal elements.

Figure 28:
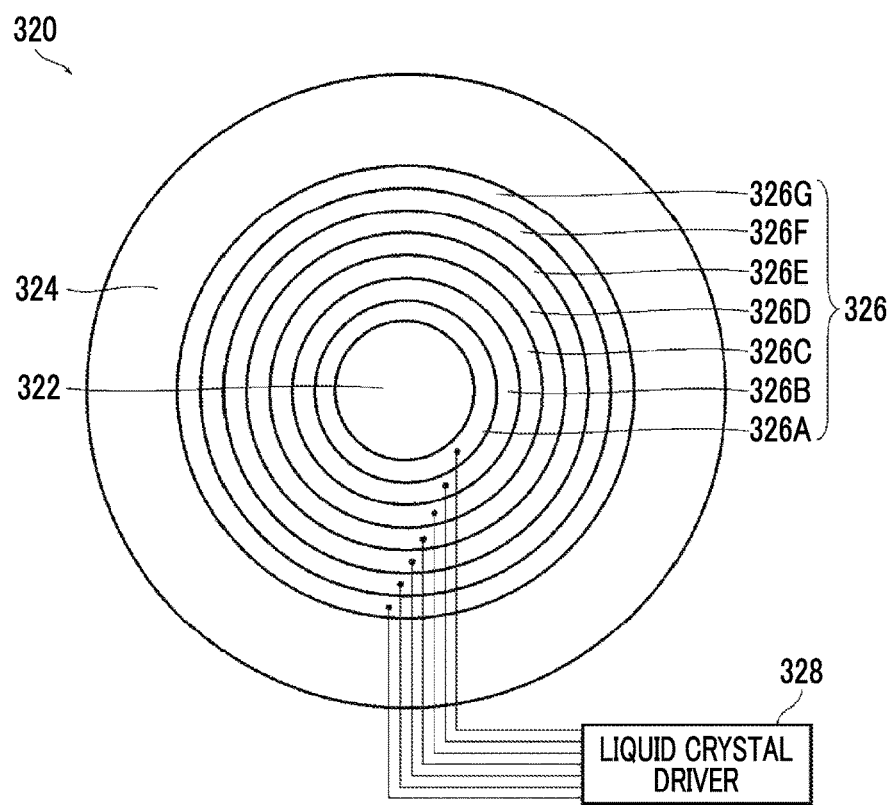
FIG. 28 is a front view illustrating an example of the second stop composed of liquid crystal elements.

FIG. 28 is a front view illustrating an example of the second stop composed of liquid crystal elements.

The common stop 320 of the present example is composed of liquid crystal elements such as STN liquid crystal, DSTN liquid crystal, or TFT liquid crystal.

The common stop 320 has a discoid shape. The common stop 320 comprises a central light transmitting region 322 having a circular shape in the central portion and an outer peripheral light transmitting region 324 having an annular shape in the outer peripheral portion. In addition, an annular light transmitting/blocking switch region 326 is provided between the central light transmitting region 322 and the outer peripheral light transmitting region 324.

The central light transmitting region 322 and the outer peripheral light transmitting region 324 are regions which have translucency and through which light is constantly transmitted.

The light transmitting/blocking switch region 326 is a region where it is possible to arbitrarily switch between the light transmitting state and the light blocking state. The light transmitting/blocking switch region 326 composes a common light blocking section in the light blocking state. The light transmitting/blocking switch region 326 is configured such that a plurality of annular regions 326A to 326G is concentrically combined. Each of the annular regions 326A to 326G is configured to be capable of individually switching between the light transmitting state and the light blocking state.

Each of the annular regions 326A to 326G composing the light transmitting/blocking switch region 326 is independently controlled by a liquid crystal driver 328 and is set in the light transmitting state or the light blocking state.

In the common stop 320 configured as described above, the aperture amount is adjusted by individually controlling the states of the respective annular regions 326A to 326G composing the light transmitting/blocking switch region 326.

Figures 29A, 29B:
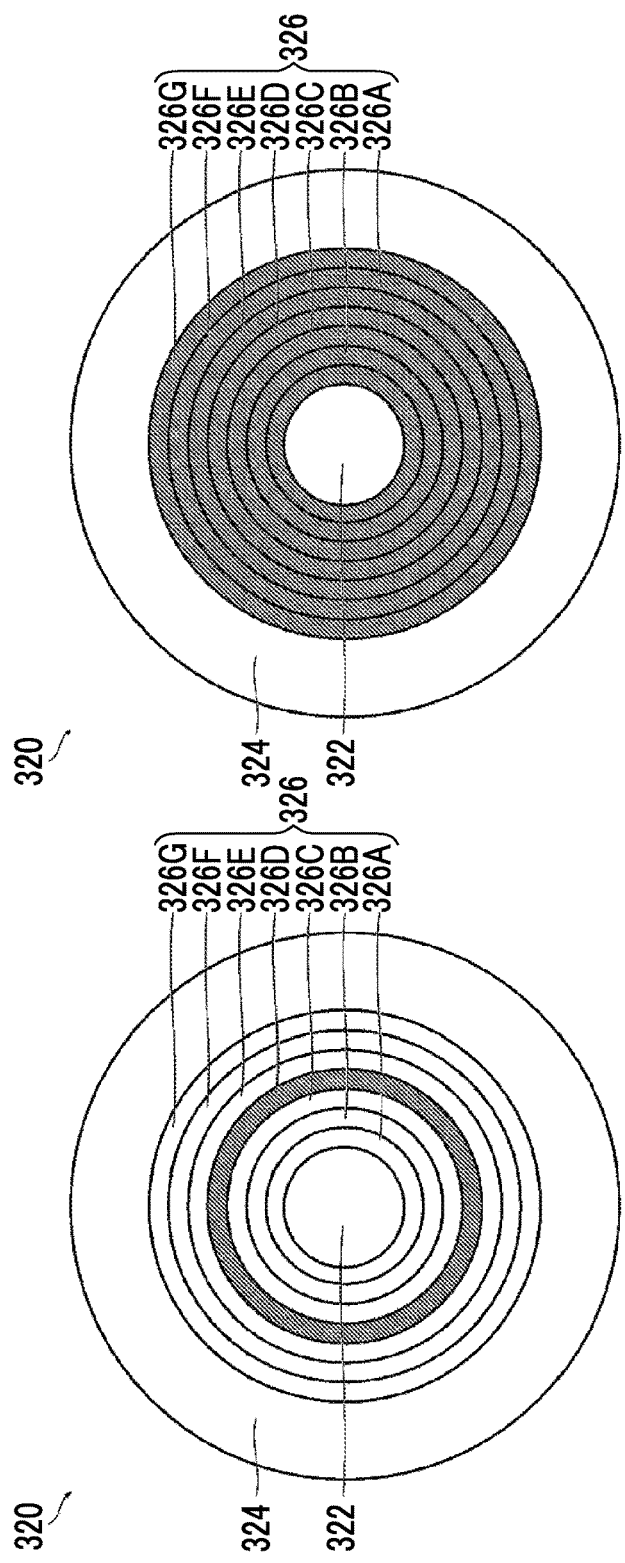
FIGS. 29A and 29B are explanatory diagrams of the operation of the common stop composed of liquid crystal elements.

FIGS. 29A and 29B are explanatory diagrams of the operation of the common stop composed of liquid crystal elements. FIG. 29A shows a state in which the aperture of the stop is reduced by one stop, and FIG. 29B shows a state in which the aperture of the stop is minimized.

As shown in FIG. 29A, in a case where the aperture of the stop is reduced by one stop, the annular region 326D positioned at the center of the light transmitting/blocking switch region 326 is set in the light blocking state, and the other annular regions 326A to 326C and 326E to 326G are set in the light transmitting state.

As shown in FIG. 29B, in a case where the aperture of the stop is minimized, all the annular regions 326A to 326G composing the light transmitting/blocking switch region 326 are in the light blocking state.

In this manner, in a case where the aperture of the common stop 320 is reduced, the light transmitting/blocking state of each annular region 326A to 326G is switched on the basis of the annular region 326D at the center. Thereby, the rays passing through the central light transmitting region 322 are blocked by enlarging the light blocking region from the outside to the inside, and the rays passing through the outer peripheral light transmitting region 324 is blocked by enlarging the light blocking region from the inside to the outside.

<Another Example of Common Stop>

In the above-mentioned embodiment, the common stop may be configured to operate with actuators, but may be manually operated. For example, a lever may be provided on the stop blade swing driving member, and the lever may be configured to be manually swung.

Further, the stop blade supporting member may be composed of a transparent material. Thereby, it is possible to reduce the effect of light blocking by the supporting member.

In the configuration of the above-mentioned embodiment, the cam pins are provided on the side of the stop blade swing driving member and the cam grooves are provided on the side of the stop blade. However, it may be possible to adopt a configuration in which a cam grooves are provided on the side of the stop blade swing driving member and cam pins are provided on the side of the stop blades.

<Another Installation Example of Common Stop>

[Configuration in which Common Stop Moves with Second Optical System]

In the configuration of the above-mentioned embodiment, the common stop is held by the first optical system holding member, and moves together with the first optical system. However, the common stop may be configured to move together with the second optical system. In this case, the common stop is held by the second optical system holding member.

Figure 32A:
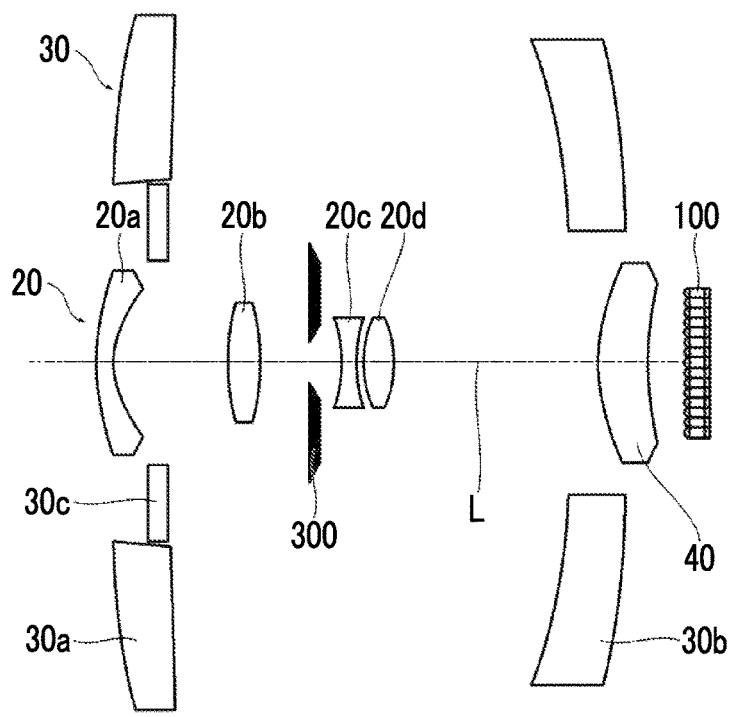
FIGS. 32A and 32B are explanatory diagrams of the operation of the common stop that moves together with the second optical system.
Figure 32B:
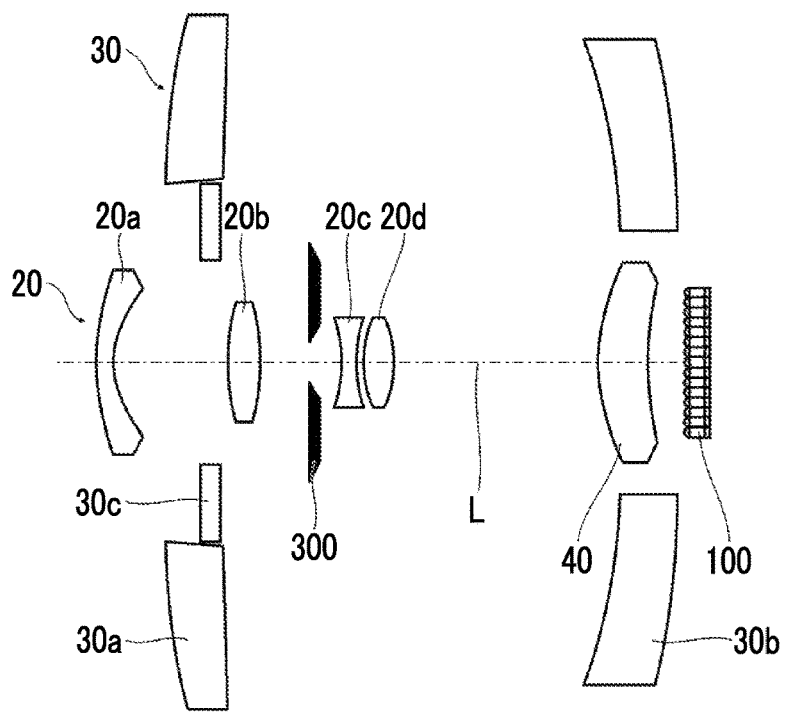

FIGS. 32A and 32B are explanatory diagrams of the operation of the common stop that moves together with the second optical system.

As shown in the drawing, in a case where the second optical system 30 is moved, the second optical system 30 and the common stop 300 integrally move back and forth on the optical axis L. In this case, even in a case where the first optical system 20 is moved, the common stop 300 does not move.

[Configuration for Movement of Common Stop]

A mechanism (common stop moving section) for moving the common stop along the optical axis L may be separately provided such that the installation position of the common stop is capable of being changed.

In this case, the installation position of the common stop may be changed manually or may be moved by an actuator.

Further, the common stop may automatically move to the optimum position in accordance with the positions of the first optical system and the second optical system.

[Making Common Stop Stationary]

The common stop can be provided to remain stationary at a certain position in the lens barrel.

[Imaging Apparatus]

Next, an imaging apparatus comprising an imaging unit will be described.

<<Configuration of Imaging Apparatus>>

FIG. 33 is a block diagram illustrating a system configuration of the imaging apparatus.

The imaging apparatus 400 is configured to mainly comprise an imaging unit 1, a lens driving control section 401, an image sensor driving control section 402, an analog signal processing section 403, a digital signal processing section 404, a display section 405, an internal memory 406, a media interface 407, a system control section 408, and an operation section 409.

As described above, the imaging unit 1 is configured to comprise the lens device 10 and the image sensor 100.

The lens device 10 is configured to comprise the first optical system 20, the second optical system 30, the common lens 40, the first stop 50, and the second stop 60.

The image sensor 100 comprises first pixels 110A that selectively receive light passing through the first optical system 20 and second pixels 110B that selectively receive light passing through the second optical system 30, respectively pupil-divides rays incident through the first optical system 20 and the second optical system 30, and selectively receives the rays by the respective pixels.

The lens driving control section 401 controls driving of the lens device 10 on the basis of a command from the system control section 408. The lens driving control section 401 comprises a first optical system driving control section that controls driving of the first optical system 20, a second optical system driving control section that controls driving of the second optical system 30, a first stop driving control section that controls driving of the first stop 50, and a second stop driving control section that controls driving of the second stop 60. The first optical system driving control section controls driving of the first optical system 20 so as to move the first optical system 20 back and forth along the optical axis L, on the basis of a command from the system control section 408. The second optical system driving control section controls driving of the second optical system 30 so as to move the second optical system 30 back and forth along the optical axis L, on the basis of a command from the system control section 408. The first stop driving control section controls driving of the first stop 50 so as to enlarge or reduce the first light blocking section of the first stop 50 on the basis of a command from the system control section 408. The second stop driving control section controls driving of the second stop 60 so as to enlarge or reduce the second light blocking section of the second stop 60 on the basis of a command from the system control section 408.

The image sensor driving control section 402 controls driving of the image sensor 100 on the basis of a command from the system control section 408. That is, reading of image signals from the image sensor 100 is controlled.

The analog signal processing section 403 loads an analog image signal of each pixel which is output from the image sensor 100, performs predetermined signal processing on the signal, converts the signal into a digital signal, and outputs the signal.

The digital signal processing section 404 loads the image signal of each pixel converted into a digital signal, and performs predetermined signal processing on the signal, thereby generating image data. At this time, the digital signal processing section 404 generates the first image data on the basis of the image signals of the first pixels 110A of the image sensor 100, and generates the second image data on the basis of the image signals of the second pixels 110B. The first image data is image data of a wide-angle image which is captured through the first optical system 20, and the second image data is image data of a telephoto image which is captured through the second optical system 30.

The display section 405 is composed of, for example, a liquid crystal monitor, and displays captured images and images being captured (so-called live view images). In addition, the display section 405 functions as a graphical user interface (GUI) as necessary.

The internal memory 406 is composed of, for example, a random access memory (RAM) and functions as a work memory.

The media interface 407 reads and writes data from and to the external memory 410 such as a memory card, on the basis of a command from the system control section 408.

The system control section 408 integrally controls the operation of the entire imaging apparatus. The system control section 408 is composed of a microcomputer comprising, for example, a central processing unit (CPU), a read only memory (ROM), and a RAM, and executes a predetermined control program, thereby controlling the entire imaging apparatus 400. Programs and various data necessary for control are stored in the ROM.

The operation section 409 is configured to comprise various operation buttons such as a power button and a shutter button, and a driving circuit thereof. Operation information of the operation section 409 is input to the system control section 408. The system control section 408 controls each section, on the basis of the operation information from the operation section 409.

<<Operation of Imaging Apparatus>>

In the imaging apparatus 400 of the present embodiment, focusing is performed manually. The photographer individually moves the first optical system 20 and the second optical system 30 through the operation section 409 so as to focus on a desired subject.

Imaging for recording an image is performed after photometry. An instruction for photometry is issued by pressing the shutter button halfway. In a case of receiving the instruction of the photometry, the system control section 408 obtains the EV value (exposure value) on the basis of the image signal obtained from the image sensor 100, and then determines the exposure. That is, the aperture value and the shutter speed at the time of imaging are determined. The aperture value is determined for each optical system.

After photometry, imaging for recording an image is performed. An instruction for imaging for recording an image is issued by fully pressing the shutter button.

In a case of receiving the instruction of the imaging for recording, the system control section 408 controls the first stop 50 and the second stop 60 through the lens driving control section 401, and sets the first stop 50 and the second stop 60 to the aperture values which are obtained by photometry. Then, the image sensor 100 is exposed at the shutter speed determined by photometry, and the image for recording is captured.

The image signal of each pixel obtained by imaging is output from the image sensor 100 to the analog signal processing section 403. The analog signal processing section 403 loads an image signal of each pixel which is output from the image sensor 100, performs predetermined signal processing on the signal, converts the signal into a digital signal, and outputs the signal.

The image signal of each pixel, which is output from the analog signal processing section 403, is loaded on the internal memory 406 and then sent to the digital signal processing section 404. The digital signal processing section 404 performs predetermined signal processing on the obtained image signal, thereby generating first image data and second image data. That is, the first image data is generated on the basis of the image signal of the first pixels 110A of the image sensor 100, and the second image data is generated on the basis of the image signal of the second pixels 110B. The generated first image data and second image data are recorded in the external memory 410 through the media interface 407.

As described above, according to the imaging apparatus 400 of the present embodiment, two images of wide angle and telephoto can be captured with one shot.

<<Modification Example of Imaging Apparatus>>

In the imaging apparatus 400 according to the above-mentioned embodiment, focusing of the first optical system 20 and the second optical system 30 may be performed manually, but may be performed automatically. For example, distance measuring means may be provided, and focusing of the first optical system 20 and the second optical system 30 may be automatically performed on the basis of the distance measurement result of the distance measuring means.

Further, in the imaging apparatus 400 of the above-mentioned embodiment, the first stop 50 and the second stop 60 may be configured to be automatically adjusted, but may be configured to be manually adjusted.

It should be noted that the imaging apparatus may be configured as a single camera, and may be incorporated in other apparatuses. For example, the imaging apparatus may be incorporated in a smartphone, a tablet type computer, a notebook type computer.

The application as an imaging apparatus is also not particularly limited, and the imaging apparatus may be used for not only usual camera applications but also applications such as surveillance cameras and in-vehicle cameras.

[Another Embodiment of Lens Device]

In the lens device according to the above-mentioned embodiment, the first optical system and the second optical system are composed of optical systems having focal lengths different from each other, but the optical systems composing the first optical system and the second optical system are not limited thereto. However, in consideration of the characteristics that two images can be captured at the same time, it is preferable that the first optical system and the second optical system are composed of optical systems having imaging characteristics different from each other.

Figure 34:
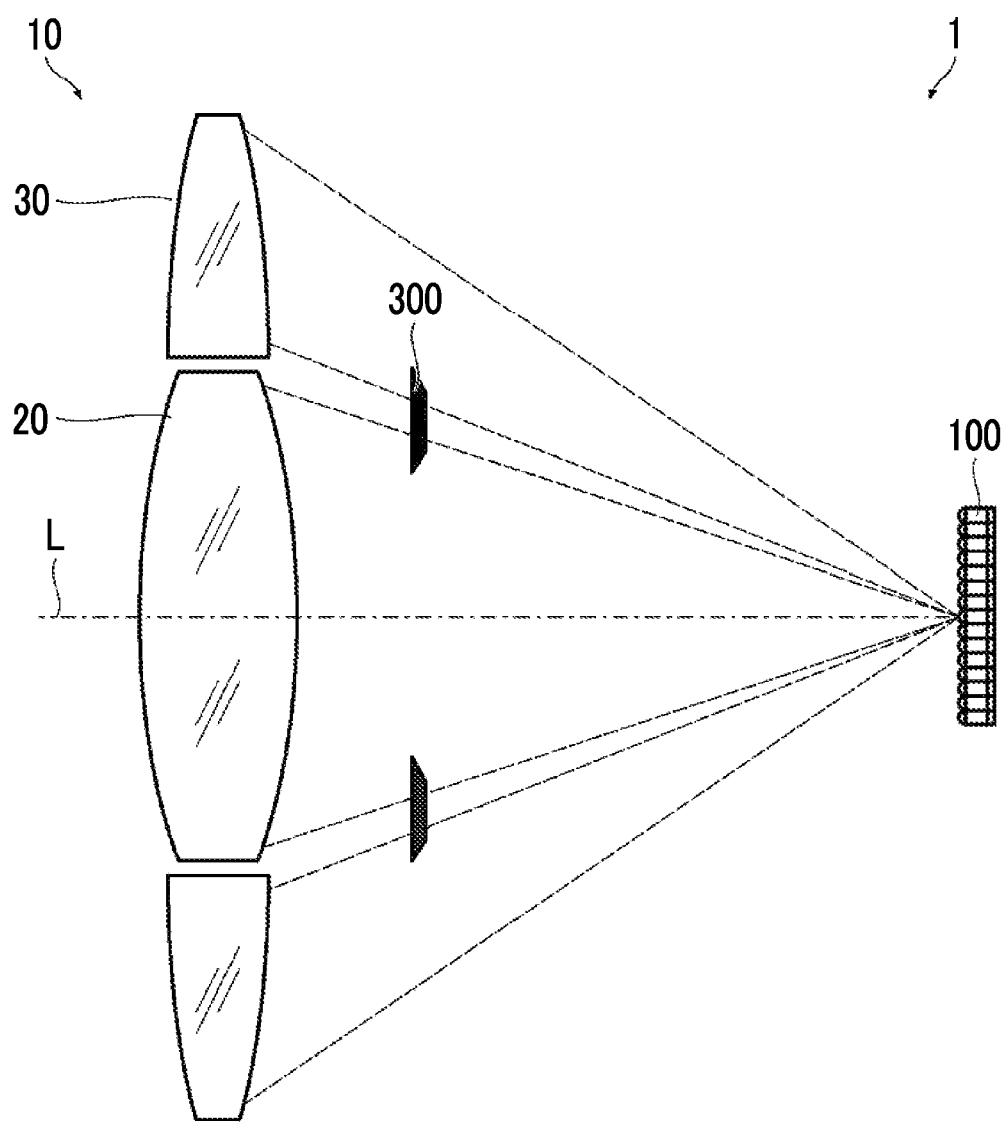
FIG. 34 is a schematic configuration diagram illustrating an example of another embodiment of the lens device.

FIG. 34 is a schematic configuration diagram illustrating an example of another embodiment of the lens device.

In the lens device 10 of the present example, the first optical system 20 and the second optical system 30 are composed of optical systems having focusing distances different from each other.

In FIG. 34, each optical system is represented by a single lens, but each optical system is capable of being composed by combining a plurality of lenses.

In the lens device 10 of the present example, the first optical system 20 is composed of an optical system that performs focusing at a range shorter than that of the second optical system 30. In this case, it is possible to capture a short range image through the first optical system 20 and a long range image through the second optical system 30.

The first optical system 20 and the second optical system 30 are arranged concentrically and each are provided so as to be individually movable along the optical axis L. That is, the first optical system 20 is provided to be movable back and forth along the optical axis L by a first optical system driving section which is not shown, and the second optical system 30 is provided to be movable back and forth along the optical axis L by a second optical system driving section which is not shown.

The lens device 10 comprises the common stop 300. The common stop 300 is disposed to block light at the boundary between the pupil regions of the first optical system 20 and the second optical system 30, and the light amounts of the first optical system 20 and the second optical system 30 are adjusted by increasing or decreasing the outer diameter and the inner diameter of the common light blocking section.

Alternatively, for example, the first optical system and the second optical system may be composed of optical systems having transmission wavelength characteristics different from each other. For example, the first optical system is composed of an optical system having transmission wavelength characteristics suitable for imaging with visible light, and the second optical system is composed of an optical system having transmission wavelength characteristics suitable for imaging with infrared light. Thereby, the visible light image can be captured through the first optical system, and the infrared image can be captured through the second optical system.

Further, in the above-mentioned embodiment, the mechanism for moving the first optical system and the second optical system back and forth along the optical axis may be configured using a cam mechanism. Further, the first optical system and the second optical system may be configured to be manually moved.

EXPLANATION OF REFERENCES

1: imaging unit, 10: lens device, 12: lens barrel, 20: first optical system, 20a: first wide-angle lens, 20b: second wide-angle lens, 20c: third wide-angle lens, 20d: fourth wide-angle lens, 30: second optical system, 30a: first telephoto lens, 30b: first telephoto mirror, 30c: second telephoto mirror, 40: common lens, 50: first stop, 52: first stop blade, 52A: first swing shaft, 52B: first cam pin, 54: first stop blade supporting member, 54A: bearing hole, 56: first stop blade swing driving member, 56A: first cam groove, 58: first light blocking section, 60: second stop, 62: second stop blades, 62A: second swing shaft, 62B: second cam groove, 64: second stop blade supporting member, 64A: inner frame, 64B: outer frame, 64C: support arm, 64D: bearing, 66: second stop blade swing driving member, 66A: fitting portion, 66B: second cam pin, 68: second light blocking section, 70: first optical system driving section, 72: first optical system holding member, 74: first guide mechanism, 74A: first guide shaft, 74B: first guide sleeve, 74C: first guide arm, 76: first driving mechanism, 76A: first screw bar, 76B: first nut, 76C: first driving arm, 76D: first optical system driving motor, 78D: second optical system driving motor, 80: second optical system driving section, 82: second optical system holding member, 84: second guide mechanism, 84A: second guide shaft, 84B: second guide sleeve, 84C: second guide arm, 86: second driving mechanism, 86A: second screw bar, 86B: second nut, 86C: second driving arm, 86D: second optical system driving motor, 100: image sensor, 110A: first pixel, 110B: second pixel, 112: micro lens, 114: light blocking mask, 210: first stop, 212: light transmitting region, 214: light transmitting/blocking switch region, 214A to 214F: annular region, 216: liquid crystal driver, 220: second stop, 222: central light transmitting region, 224: outer peripheral light transmitting region, 226: light transmitting/blocking switch region, 226A to 226F: annular region, 228: liquid crystal driver, 300: common stop, 302: stop blade, 302A: first blade part, 302B: second blade part, 302C: swing shaft, 302D: cam groove, 304: stop blade supporting member, 304A: inner frame, 304B: outer frame, 304C: support arm, 304D: bearing, 306: stop blade swing driving member, 306A: fitting portion, 306B: cam pin, 308: common light blocking section, 320: common stop, 322: central light transmitting region, 324: outer peripheral light transmitting region, 326: light transmitting/blocking switch region, 326A to 326G: annular region, 328: liquid crystal driver, 400: imaging apparatus, 401: lens driving control section, 402: image sensor driving control section, 403: analog signal processing section, 404: digital signal processing section, 405: display section, 406: internal memory, 407: media interface, 408: system control section, 409: operation section, 410: external memory, L: optical axis

What is claimed is:

1. A lens device comprising:
   a first optical system;
   a second optical system that is disposed concentrically with the first optical system and has an annular shape;
   a first stop that adjusts a light amount of light passing through the first optical system;
   a second stop that adjusts a light amount of light passing through the second optical system;
   a first optical system driving section that integrally moves the first optical system and the first stop along an optical axis; and
   a second optical system driving section that integrally moves the second optical system and the second stop along the optical axis.

2. The lens device according to claim 1,
   wherein the first stop has a first light blocking section of which an inner diameter is capable of being increased or decreased and which has an annular shape, and
   wherein the second stop has a second light blocking section of which an outer diameter is capable of being increased or decreased and which has an annular shape.

3. The lens device according to claim 2,
   wherein the second stop has
   a plurality of second fulcrums that are arranged with regular intervals on a same circumference,
   a plurality of second stop blades that are swingably supported by the second fulcrums, are arranged to overlap, and compose the second light blocking section, and
   a second stop blade driving section that swings the second stop blades synchronously, and
   wherein by swinging the second stop blades synchronously through the second stop blade driving section so as to increase or decrease the outer diameter of the second light blocking section, a light amount of the light passing through the second optical system is adjusted.

4. The lens device according to claim 3,
wherein the second stop blade driving section has
a second stop blade swing driving member that is disposed coaxially with the second light blocking section, is swingable in a circumferential direction, and has an annular shape,
a second cam groove that is disposed on the second stop blade swing driving member or on the second stop blades, and
a second cam pin that is disposed on the second stop blade swing driving member or on the second stop blades, the other than the second cam groove disposed.

5. The lens device according to claim 4, further comprising
a second stop blade supporting member that is transparent,
wherein the second stop blade supporting member has the second fulcrum.

6. The lens device according to claim 2,
wherein the first stop has
a plurality of first fulcrums that are arranged with regular intervals on a same circumference,
a plurality of first stop blades that are swingably supported by the first fulcrums, are arranged to overlap, and compose the first light blocking section, and
a first stop blade driving section that swings the first stop blades synchronously, and
wherein by swinging the first stop blades synchronously through the first stop blade driving section so as to increase or decrease the inner diameter of the first light blocking section, a light amount of the light passing through the first optical system is adjusted.

7. The lens device according to claim 6,
wherein the first stop blade driving section has
a first stop blade swing driving member that is disposed coaxially with the first light blocking section, is swingable in a circumferential direction, and has an annular shape,
a first cam groove that is disposed on the first stop blade swing driving member or on the first stop blades, and
a first cam pin that is disposed on the first stop blade swing driving member or on the first stop blades, the other than the first cam groove disposed.

8. The lens device according to claim 2,
wherein the first stop is composed of liquid crystal elements.

9. A lens device comprising:
a first optical system;
a second optical system that is disposed concentrically with the first optical system and has an annular shape;
a first optical system driving section that moves the first optical system along an optical axis;
a second optical system driving section that moves the second optical system along the optical axis; and
a common stop that blocks light at a boundary between the first optical system and the second optical system, has a common light blocking section of which an inner diameter and an outer diameter are capable of being increased or decreased and which has an annular shape, and adjusts a light amount of light passing through the first optical system and the second optical system by increasing or decreasing the inner diameter and the outer diameter of the common light blocking section.

10. The lens device according to claim 9,
wherein the common stop has
a plurality of fulcrums that are arranged with regular intervals on a same circumference,
a plurality of stop blades that are swingably supported by the fulcrums, are arranged to overlap, and compose the common light blocking section, and
a stop blade driving section that swings the stop blade synchronously,
wherein by swinging the stop blades synchronously through the stop blade driving section so as to decrease an inner diameter in conjunction with an increase of the outer diameter of the common light blocking section and increase the inner diameter in conjunction with a decrease of the outer diameter, light amounts of light passing through the first optical system and the second optical system are adjusted.

11. The lens device according to claim 10,
wherein the stop blade driving section has
a stop blade swing driving member that is disposed coaxially with the common light blocking section, is swingable in a circumferential direction, and has an annular shape,
a cam groove that is disposed on the stop blade swing driving member or on the stop blades, and
a cam pin that is disposed on the stop blade swing driving member or on the stop blades, the other than the cam groove disposed.

12. The lens device according to claim 9,
wherein the common stop is composed of liquid crystal elements.

13. The lens device according to claim 9,
wherein the first optical system driving section integrally moves the first optical system and the common stop along the optical axis.

14. The lens device according to claim 9,
wherein the second optical system driving section integrally moves the second optical system and the common stop along the optical axis.

15. The lens device according to claim 9,
wherein the common stop remains stationary at a certain position.

16. The lens device according to claim 9, further comprising
a common stop moving section that moves the common stop along the optical axis.

17. The lens device according to claim 1,
wherein the first optical system and the second optical system have imaging characteristics different from each other.

18. The lens device according to claim 9,
wherein the first optical system and the second optical system have imaging characteristics different from each other.

19. The lens device according to claim 17,
wherein the first optical system and the second optical system have transmission wavelength characteristics different from each other.

20. The lens device according to claim 18,
wherein the first optical system and the second optical system have transmission wavelength characteristics different from each other.

* * * * *